US011651417B2

United States Patent
Oh et al.

(10) Patent No.: US 11,651,417 B2
(45) Date of Patent: *May 16, 2023

(54) METHOD, SYSTEM, AND NON-TRANSITORY PROCESSOR-READABLE MEDIUM FOR INTELLIGENT LISTING CREATION FOR A FOR SALE OBJECT

(71) Applicant: Mercari, Inc., Palo Alto, CA (US)

(72) Inventors: Byong Mok Oh, Los Altos, CA (US); Takuma Yamaguchi, Saitama (JP); Rishabh Kumar Shrivastava, Tokyo (JP); Fritz Mikio Kuribayashi, Tokyo (JP); John Alexander Lagerling, Los Altos Hills, CA (US); Minami Tanaka, Tokyo (JP)

(73) Assignee: MERCARI, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/839,934

(22) Filed: Jun. 14, 2022

(65) Prior Publication Data

US 2022/0309562 A1    Sep. 29, 2022

Related U.S. Application Data

(63) Continuation of application No. 16/912,411, filed on Jun. 25, 2020, now Pat. No. 11,393,013.

(51) Int. Cl.
*G06Q 30/06* (2023.01)
*G06Q 30/0601* (2023.01)
(Continued)

(52) U.S. Cl.
CPC ........ *G06Q 30/0633* (2013.01); *G06N 3/084* (2013.01); *G06N 7/01* (2023.01);
(Continued)

(58) Field of Classification Search
CPC ........ G06Q 30/06–08; G06Q 30/0603; G06Q 30/0611; G06Q 30/0633; G06N 3/084; G06N 7/005
(Continued)

(56) References Cited

U.S. PATENT DOCUMENTS 9,704,123 B2    7/2017   Jin et al.
11,049,156 B2   6/2021   Teo
(Continued)

FOREIGN PATENT DOCUMENTS

JP    2022-526874 A    5/2022

OTHER PUBLICATIONS

Kumkar, P., et al. "Comparison of Ensemble Methods for Real Estate Appraisal," 2018 3rd International Conference on Inventive Computation Technologies (ICICT), pp. 297-300, doi: 10.1109/ICICT43934.2018.9034449. (Year: 2018).*
(Continued)

*Primary Examiner* — Allison G Wood
*Assistant Examiner* — Katherine A Barlow
(74) *Attorney, Agent, or Firm* — Sterne, Kessler, Goldstein & Fox P.L.L.C.

(57) ABSTRACT

Disclosed herein are embodiments for intelligent listing creation for a for sale object (FSO). Some embodiments operate by determining a numerical identifier corresponding to a category of the FSO. A binarization of the numerical identifier using hot encoding is performed and using a neural network regression model, an optimal offer price is generated based on a category of the FSO. Information about the FSO is provided to the neural network regression model that tokenizes the textual input, and a unique binary vector representing the category is provided instead of the numerical identifier to the neural network regression model. An optimal price, generated by the neural network regression
(Continued)

model, based on the unique binary vector representing the category.

20 Claims, 15 Drawing Sheets

(51) Int. Cl.
  *G06N 3/084*    (2023.01)
  *G06Q 30/0279*   (2023.01)
  *G06N 7/01*     (2023.01)
  *G06N 7/00*     (2023.01)
  *G06N 3/08*     (2023.01)
  *G06Q 30/02*    (2023.01)

(52) U.S. Cl.
  CPC ..... *G06Q 30/0279* (2013.01); *G06Q 30/0611* (2013.01); *G06Q 30/0643* (2013.01)

(58) Field of Classification Search
  USPC ...................................... 705/26.8, 26.1–27.2
  See application file for complete search history.

(56) References Cited

U.S. PATENT DOCUMENTS

| | | |
|---|---|---|
| 11,074,634 B2 | 7/2021 | Oh et al. |
| 11,080,483 B1 | 8/2021 | Islam et al. |
| 11,270,326 B2 | 3/2022 | Wu et al. |
| 11,341,550 B2 | 5/2022 | Schubert et al. |
| 11,393,013 B2 | 7/2022 | Oh et al. |
| 2004/0128224 A1 | 7/2004 | Dabney et al. |
| 2005/0246265 A1 | 11/2005 | McHale et al. |
| 2008/0114663 A1 | 5/2008 | Watkins et al. |
| 2010/0241454 A1 | 9/2010 | Firminger et al. |
| 2010/0268640 A1 | 10/2010 | Kuyper et al. |
| 2011/0258580 A1 | 10/2011 | Syijarinne et al. |
| 2012/0041816 A1 | 2/2012 | Buchalter |
| 2013/0024313 A1* | 1/2013 | Dayal .................... G06Q 30/06 705/26.2 |
| 2014/0074665 A1 | 3/2014 | Stewart |
| 2014/0108206 A1* | 4/2014 | Chechuy ............ G06Q 30/0603 705/27.1 |
| 2015/0095265 A1 | 4/2015 | Feinendegen et al. |
| 2015/0310468 A1 | 10/2015 | Mesaros |
| 2015/0339690 A1 | 11/2015 | Stevens |
| 2016/0086206 A1 | 3/2016 | Churchill et al. |
| 2017/0308846 A1 | 10/2017 | de Mars et al. |
| 2019/0197398 A1 | 6/2019 | Jamali et al. |
| 2019/0325490 A1 | 10/2019 | Acriche |
| 2020/0034903 A1 | 1/2020 | Yamamoto et al. |
| 2020/0104866 A1 | 4/2020 | Lagerling et al. |
| 2020/0151743 A1* | 5/2020 | Acriche .............. G06F 3/04883 |
| 2020/0234326 A1 | 7/2020 | Lagerling |
| 2020/0349595 A1 | 11/2020 | Anderson |
| 2021/0034708 A1* | 2/2021 | Prasad .................... G06F 40/30 |
| 2021/0065219 A1 | 3/2021 | Manion et al. |
| 2021/0082037 A1 | 3/2021 | Oh |
| 2021/0406937 A1 | 12/2021 | Oh et al. |
| 2021/0406988 A1 | 12/2021 | Oh et al. |

OTHER PUBLICATIONS

Okada, S., et al. "Efficient partition of integer optimization problems with one-hot encoding." Scientific Reports vol. 9, 13036. https://doi.org/10.1038/s41598-019-49539-6 (Year: 2019).*

Heller, Martin. "Supervised learning explained" InfoWorld.com (Year: 2019).

Wallheimer, Brian. "Are You Ready for Personalized Pricing? Companies are figuring out what individual customers will pay-and charging accordingly." ChicagoBoothReview.com (Year: 2018).

Spector, Nicole. How to sell your unwanted stuff (2020) NBCNews.com (Year: 2020).

Cision PRweb "ginnie: New Artificial Intelligence Software Set to Help eCommerce Sellers Grow Sales with Better Product Descriptions" May 9, 2019. prweb.com (Year: 2019).

International Search Report and Written Opinion directed to related International Application No. PCT/US2021/033052, dated Jun. 30, 2021; 11 pages.

* cited by examiner

METHOD, SYSTEM, AND NON-TRANSITORY PROCESSOR-READABLE MEDIUM FOR INTELLIGENT LISTING CREATION FOR A FOR SALE OBJECT

CROSS-REFERENCE TO RELATED APPLICATIONS

This application is a continuation of U.S. patent application Ser. No. 16/912,411 titled "Computer Technology for Intelligent Listing Creation", filed Jun. 25, 2020, which is incorporated by reference in its entirety.

This application is also related to U.S. patent application Ser. No. 16/253,719 titled "Temporal Disposition Of Offers Based On Decay Curves," filed Jan. 22, 2019; U.S. patent application Ser. No. 16/288,379 titled "Probabilistic Item Matching And Searching," filed Feb. 28, 2019; U.S. patent application titled "Inventory Ingestion And Pricing System," Ser. No. 16/288,203, filed Feb. 28, 2019; and U.S. Provisional Application No. 62/900,764 titled "Automating The Creation Of Listings Using Augmented Reality Computer Technology," filed Sep. 16, 2019, all of which are herein incorporated by reference in their entireties.

BACKGROUND

A number of ecommerce sites exist where users can sell their unwanted items, such as MERCARI, EBAY, AMAZON, POSHMARK, LETGO, CRAIGSLIST, etc. Conventionally, in order to sell on these sites, users must manually create listings for offering their items for sale. The quality of such listings can vary greatly, and may depend on a number of factors, such as the user's experience creating listings, the information the user has on the item (such as make, model, brand, size, color, features, etc.), the user's photo taking skills, whether the user is rushed when creating the listing, whether this is the first time the user has ever tried to sell an item of this type, etc. Since a well-constructed listing will increase the likelihood that the associated item will sell, it would be advantageous if computer technology could be employed to enhance the quality of listings.

Also, a key element when creating a listing is establishing an offer price (that is, a price that the associated item is being offered for sale). If the offer price is too low, the user may not receive the full value of the item. If the offer price is too high, it may take a long time for the item to sell, or the item may never sell. Again, it would be advantageous if computer technology could be employed to assist users with pricing their items for sale.

SUMMARY

Provided herein are system, apparatus, article of manufacture, method and/or computer program product embodiments, and/or combinations and sub-combinations thereof, for automatic, intelligent generation of listings for a for sale object (FSO) being offered by a seller.

Some embodiments operate by: receiving information relating to the FSO, including specifications for selling the FSO and an election of an automatic listing option; determining a category of the FSO; generating an optimal offer price based on at least the category; and generating multiple listings for the FSO, wherein the multiple listings have varying titles, descriptions, pictures and offer prices, so as to parallelize the selling of the FSO. The information may include pictures of the FSO, and the category may be determined by analyzing the pictures.

The multiple listings may be generated by: identifying potential buyers based on searches and past purchases; determining tendencies and preferences of the potential buyers by analyzing the searches and past purchases; and customizing at least some of the listings based on the determined tendencies and preferences. Then, the customized listings may be provided to the respective potential buyers.

Also provided herein are system, apparatus, article of manufacture, method and/or computer program product embodiments, and/or combinations and sub-combinations thereof, for automatic, intelligent generation of an offer price for a FSO.

Some embodiments may operate by: receiving information relating to the FSO, including specifications for selling the FSO, wherein the specifications include an original offer price and a time window for selling the FSO; determining a category of the FSO; generating an optimal offer price for the FSO based on one or more of: (a) past listings of previously sold FSOs that have a same or similar category of the FSO; (b) the specifications, including the time window; (c) a category decay curve applicable to the category; and (d) a seller flexibility curve of the seller. The optimal offer price may be suggested to the seller as an offer price for a listing corresponding to the FSO.

Generating the optimal offer price may include: identifying past listings of the previously sold FSOs that have the same or similar category of the FSO; accessing transaction information from the identified past listings; and generating the optimal price based on at least the transaction information using either a statistics based approach, or through artificial intelligence techniques such as machine learning.

The optimal price may be adjusted, either initially due to seller requirements, or as time goes on, based on the category decay curve applicable to the category and/or the seller flexibility curve of the seller. The optimal price may be also or alternatively adjusted based on a determination that the seller elected a charitable option.

Some embodiments may also include: generating zones of possible agreement (ZOPA) based on at least one of (a) the category decay curve applicable to the category; and (b) the seller flexibility curve of the seller; periodically, generating a new offer price for the listing based on a ZOPA corresponding to a current listing age; and offering the new offer price to the seller.

Further features and advantages of the embodiments disclosed herein, as well as the structure and operation of various embodiments, are described in details below with reference to the accompanying drawings. It is noted that this disclosure is not limited to the specific embodiments described herein. Such embodiments are presented herein for illustrative purposes only. Additional embodiments will be apparent to a person skilled in the relevant art based on the teachings contained herein.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing/figure in which the reference number first appears.

DETAILED DESCRIPTION

Provided herein are system, apparatus, device, method and/or computer program product embodiments, and/or combinations and sub-combinations thereof, for using computer technology to provide pricing guidance, and to intelligently create and process listings for selling FSOs (for sale objects), according to some embodiments.

Figure 1:
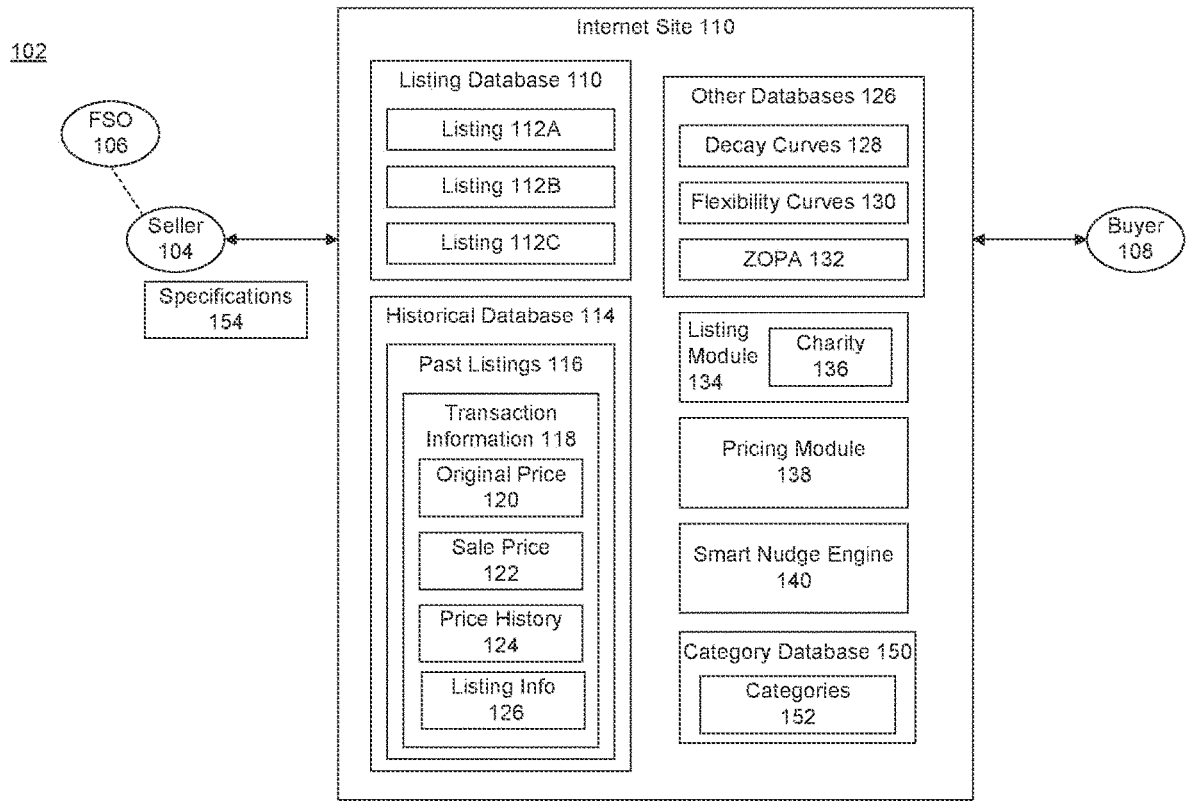
FIG. 1 illustrates a computing environment having an interne site for selling "for sale objects" (FSO), according to some embodiments.
Figure 10:
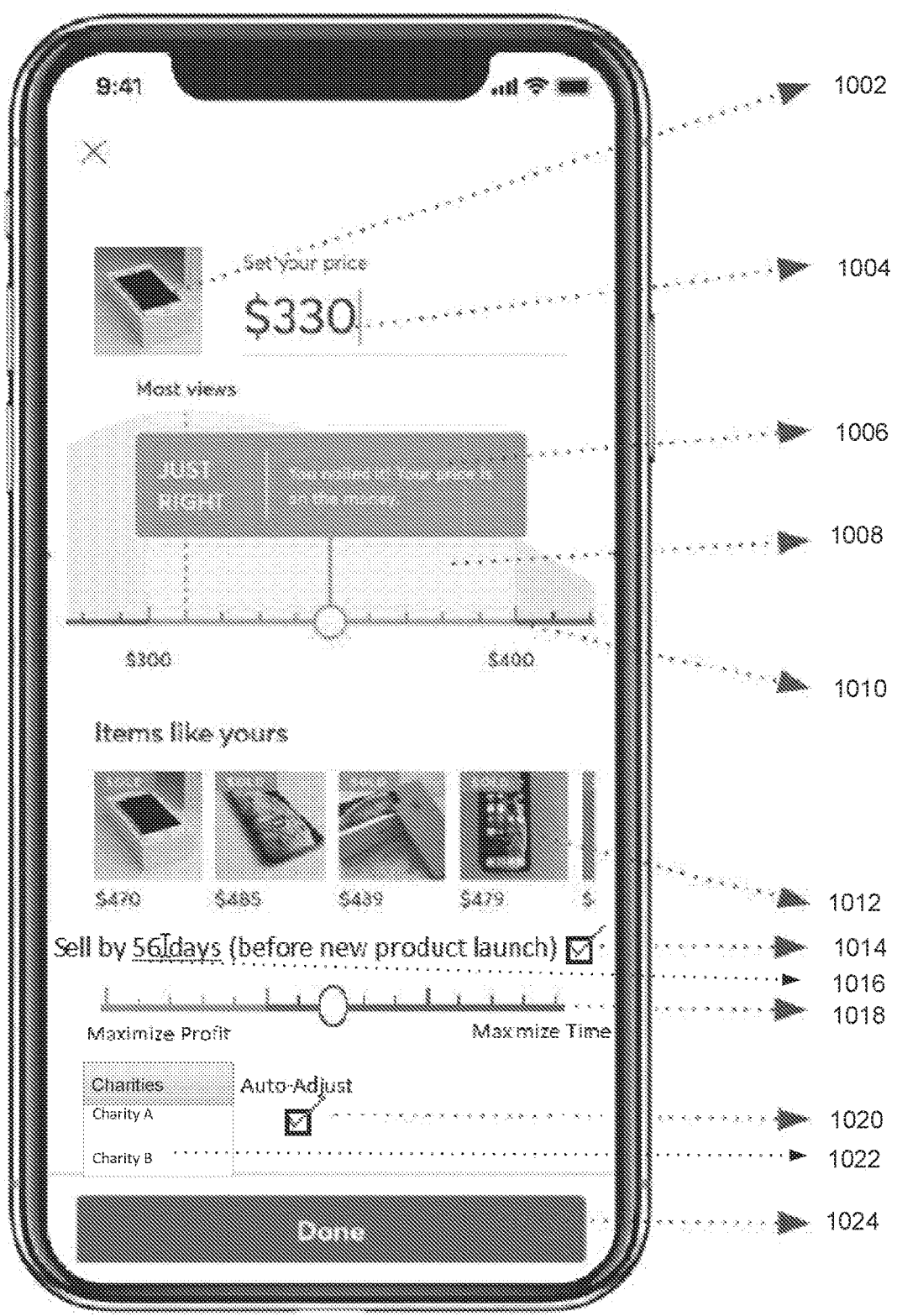
FIG. 10 provides an example graphical user interface (GUI) for both relaying the optimal price and associated information to the user, as well as gathering information from the user, according to some embodiments.

FIG. 1 illustrates a computing environment 102 having an internet site 110, which may be implemented using one or more computer systems 1000 such as shown in FIG. 10 (and further described below). In some embodiments, the site 110 enables sellers 104 and buyers 108 to sell and buy, respectively, products and/or services, which may be collectively herein referred to as for sale objects (FSOs). Examples of site 110 include MERCARI, EBAY, AMAZON, POSHMARK, LETGO, CRAIGSLIST, etc., to name just some examples. Sellers 104 and buyers 108 may access the site 110 via the Internet, for example.

Sellers 104 may create listings 112 on the site 110 to sell their FSOs 112. The listings 112 may be stored in a listing database 110. Buyers 108 may browse and search listings 112 to find FSOs 112 of interest to purchase. At any given time, a given user may be selling and/or buying FSOs 106 using the site 110 (that is, a given user may be a seller 104 and/or a buyer 108 at any given time on the site 110).

Figure 4:
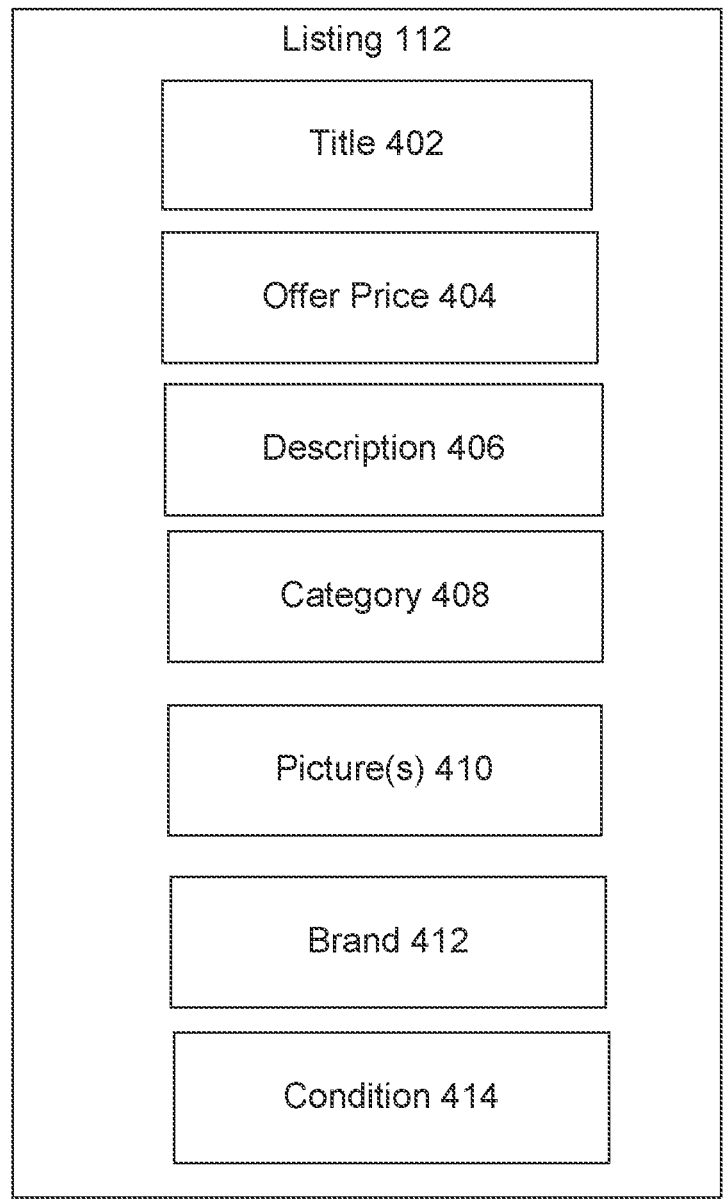
FIG. 4 illustrates an example listing, according to some embodiments.

As shown in FIG. 4, each listing 112 may include a title 402, description 406 and pictures 410 of the FSO 106 that is being offered for sale. Additionally, in some embodiments, the listing also includes the brand/make 412 and condition 414 of the FSO 106. The listing 112 may also store the current otter price 404 of the FSO 106 (that is, the price that the FSO 106 is being currently offered for sale via the listing 112 on the site 110). According to some embodiments, a pricing module 138 may intelligently provide guidance to the seller 104: (1) for setting the initial offer price 404 of any given FSO 106, and also (2) for adjusting the offer price 404 over time prior to the sale of the FSO 106 on the site 110. This is further described below.

The FSOs 106 may be organized into categories 152, such as clothing, furniture, tools, electronics, fine art, painting services, accounting services, etc. The listing 112 may store the category 408 of the FSO 106, which may also be provided by the user. Information regarding categories 408 may be cross-checked, changed appropriately as described herein if the user has indicated a wrong category 408, and stored in a category database 150 in the site 110.

The internet site 110 may include a historical database 114. The historical database 114 may store past listings 116 of FSOs 106 that have sold in the past. That is, when a FSO 106 sells, its associated listing 112 becomes a past listing 116 that is stored in the historical database 114.

Each past listing 116 may include the fields of listings 112 shown in FIG. 4. For example, such a past listing 116 may include transaction information 118, including the listing information 126. Listing information 126, in turn, may include some or all information fields provided in sample listing 112 in FIG. 4 (e.g., title 402, offer price 404, description 406, category 408, picture(s) 410, brand 412, and condition 414). Also or alternatively, the transaction information 118 of each past listing 116 may also include original price 120, sale price 122, and price history 124. This information pertains to the pricing and sale history of the associated FSO 106 prior to its sale on the site 110.

Figure 2:
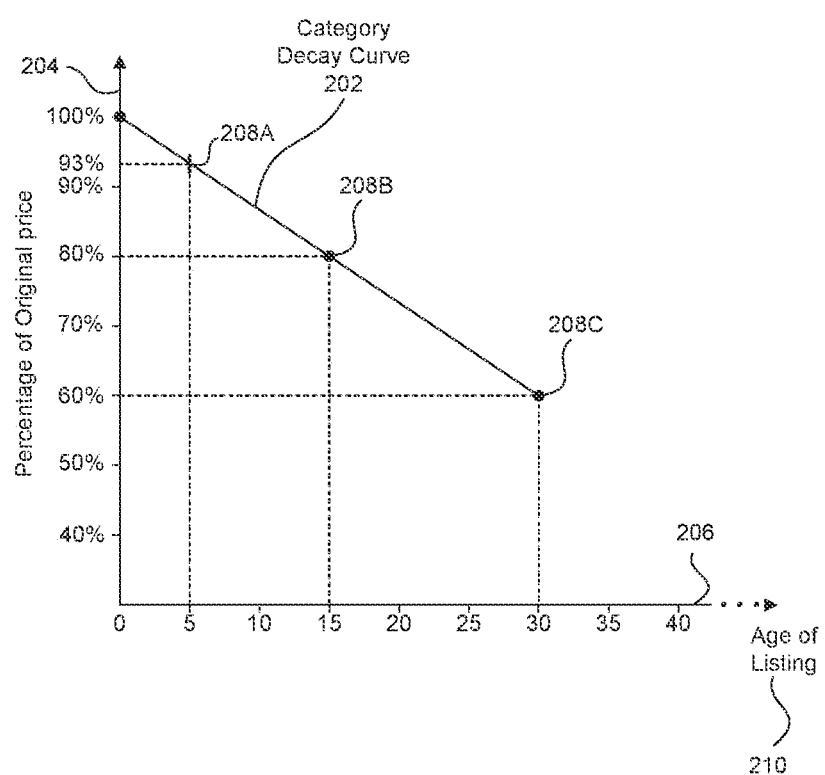
FIG. 2 illustrates an example category decay curve, according to some embodiments.
Figure 3:
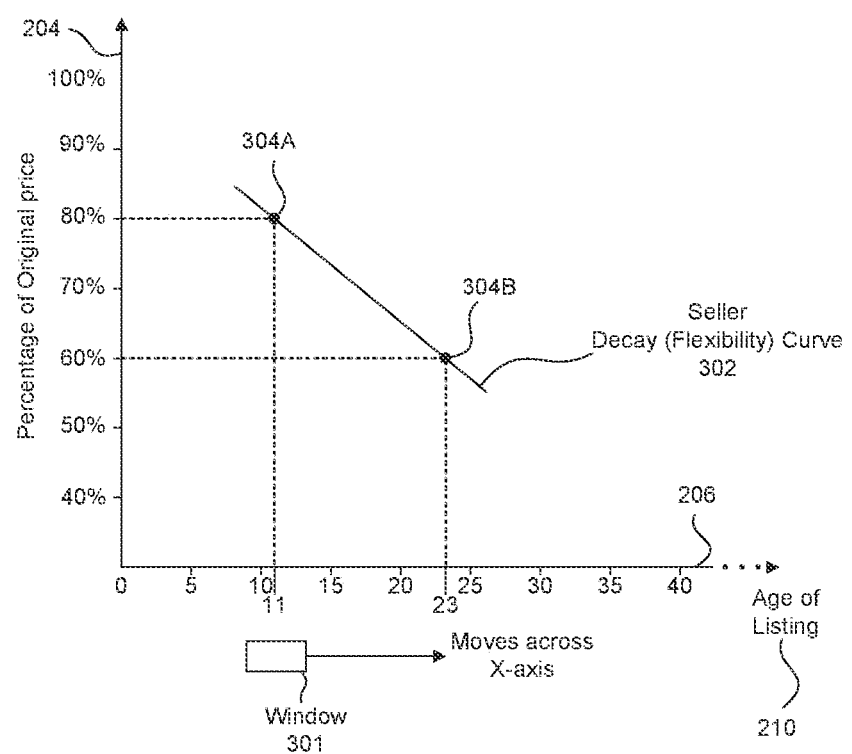
FIG. 3 illustrates an example seller decay curve (also called a seller flexibility curve), according to some embodiments.
Figure 5:
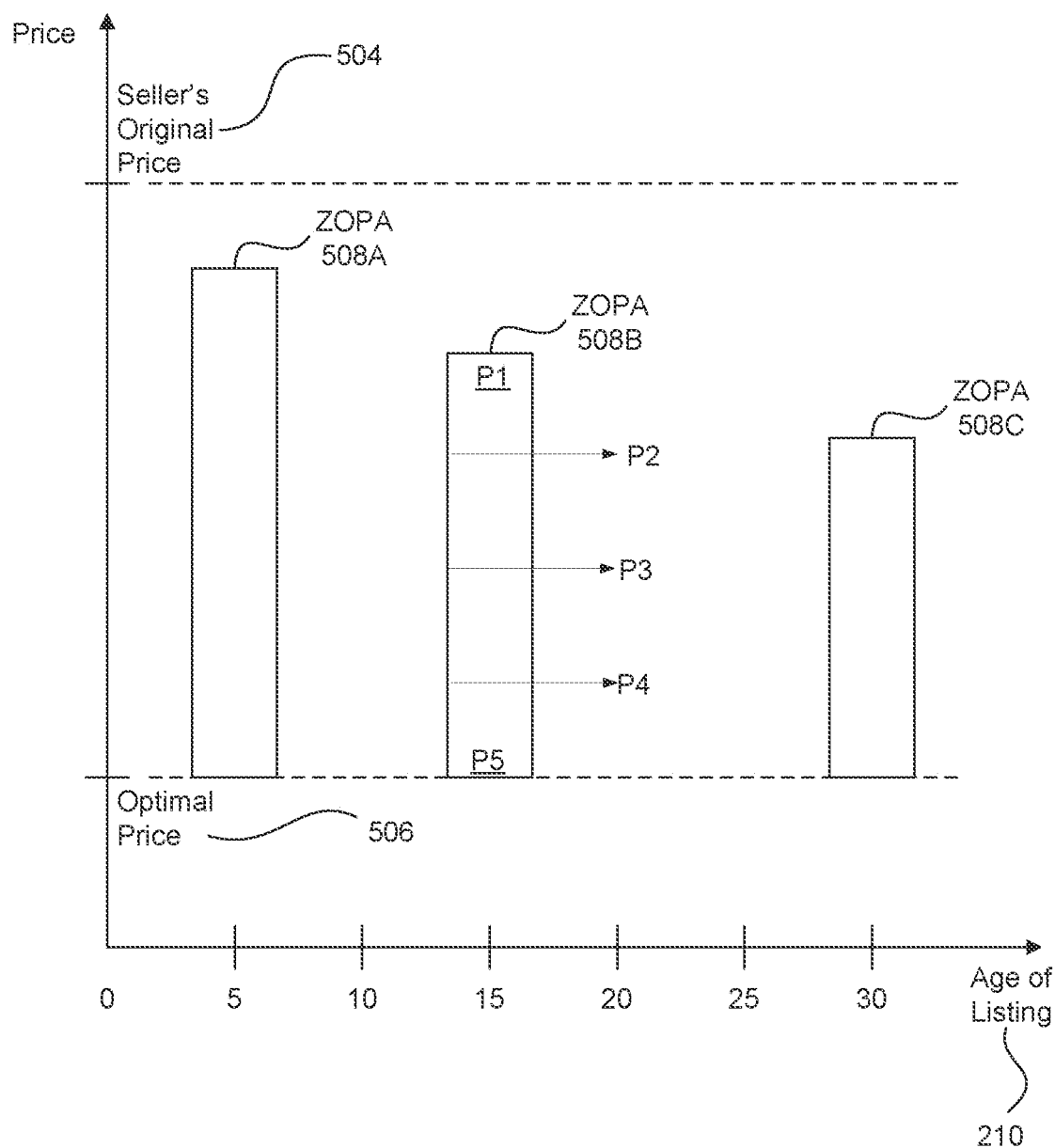
FIG. 5 illustrates various example ZOPAS (zones of possible agreement), according to some embodiments.

For example, the pricing history 124 may include information indicating: how long it took for the FSO 102 to sell after it was originally listed on the site 110, pricing changes (typically price decreases, although price increases are also possible), and/or when those pricing changes took place measured from when the FSO 102 was originally listed on the site 110 (called the "age of the listing," showed in FIGS. 2, 3 and 5 as 210).

Category Decay Curves and Seller Flexibility Curves

The internet site 110 may also include other databases 126. The other databases 126 may store decay curves 128, flexibility curves 130, and/or information relating to ZOPAs 132 (zones of possible agreement). Decay curves 128 and flexibility curves 130 shall now be described. ZOPAs 132 are described further below.

Decay curves 128 reflect the fact that at least some sellers 104 are more willing to sell their FSOs 106 for lower prices depending on how long their FSOs 106 have been listed (that is, the age 210 of the associated listings 112), and/or the respective categories 152 of their FSOs 106. For example, the longer a given FSO 106 has been listed, the seller 104 may be more willing to accept lower prices. Also, such a decay curve 128 may be category-dependent. That is, the seller 104 may be more willing to accept lower prices for some categories 152 of FSOs 106 (such as used clothing and used furniture) as compared to other categories 152 (such as high end electronics and fine art).

Also, different sellers 104 may vary on the price they are willing to accept for any given FSO 106. For example, some sellers 104 may be naturally inclined to accept lower prices than other sellers 104.

FIG. 2 illustrates an example decay curve 202. In some embodiments, each decay curve 202 corresponds to a category 152 of FSOs 106. The decay curve 202 (also called category decay curve 202) takes into consideration (1) the age 210 of the listing 112; and (2) the category 152 (stored in 408 of the listing 112) of the FSO 106.

The decay curves 202 may be generated and updated by the pricing module 138. Specifically, the pricing module 138 may analyze past listings 116 in the historical database 114 for sellers 104 to generate a category decay curve 202 for each category 152. In some embodiments, the category decay curve 202 shows, for a given category 152, the prices at which sellers 104 were willing to sell their FSOs 106 over time (where time is based on the age 210 of the listing 112 when the FSOs 106 sold).

In the example of FIG. 2, the category decay curve 202 shows that when listings 112 in a given category 152 are created (that is, listing age 210 equals 0), sellers were willing to sell only at 100% of the original listing price 120. However, within 5 days after listings 112 were created, at least some sellers 104 were willing to sell their FSOs 106 at 93% of the price 120 (this is indicated by 208A). At 15 days after the listing 112 was created, some sellers 104 in the given category 152 were willing to sell their FSOs 106 at 80% of the original price 120 (this is indicated by 208B). Similarly, at 30 days after the listing 112 was created, some sellers 104 were willing to sell their FSOs 106 at 60% of the original price 120 (this is indicated by 208C).

Each of these points 208—which may be called decay points 208 herein—may be generated by averaging the sales data collected by the pricing module 138 at particular listing ages 210, and/or at particular percentages of the original price 120. For example, suppose at listing age 210=15 days, there were 5 sales (in the category 152 associated with category decay curve 202) at the following percentages of the original price 120: 100%, 90%, 80%, 70% and 60%. The pricing module 138 would thereby determine the average of these percentages to be 80%, and thus create decay point 208B of 80% in the category decay curve 202.

In some embodiments, the number of sales must be greater than a threshold over a predetermined time period in order to generate a decay point 208. The predetermined time period may be 1 month, 3 months, or any other time period. Referring again to the example of FIG. 2, and for the predetermined time period, if this threshold is 10, then the pricing module 138 would not create the decay point 208B since the number of sales (5) are less than the threshold (10).

As just described, in some embodiments, category decay curves 202 are associated with categories 152. In other embodiments, the pricing module 138 also tracks the past activities of sellers 104 to determine each seller's 104 willingness (that is, flexibility) to accept lower sale prices over time 210. For example, the pricing module 138 may analyze the transaction information 118 in past listings 116 for a given seller 104 to generate a seller decay curve (also called seller flexibility curve) 302 for the seller 104 (see the example in FIG. 3; shown as 130 in FIG. 1). In some embodiments, the seller flexibility curve 302 may show, for a given seller 104, the percentages by which the seller 104 reduced the offer price 404 in his listings 112, and the times (in terms of the age 210 of the listing 112) such reductions occurred. The seller flexibility curve 302 may also show the percentages off the original price 120 that the seller 104 accepted offers from buyers 108, and the times such acceptances occurred.

For example, the example seller flexibility curve 302 in FIG. 3 shows that the associated seller 104 (for whom the curve 302 applies) has a history of selling at 80% of the original price 120 at 11 days after creating listings 112 (see point 304A), and at 60% at 23 days (see 304B).

Each of these points 304—which may be called seller reduction points 304 herein—may be generated by averaging the sales data in past listings 116 (associated with the seller 104) at particular listing ages 210, and/or at particular percentages of the original price 120. For example, supposed at listing age 210=10 days, the seller 104 reduced the price 404 to 90% of the original price 120 in a first listing, and at listing age 210=12 days, the seller 104 accepted an offer price that was at 70% of the original price 120 in a second listing. In this case, the pricing module 138 may create a seller reduction point 304A of 80% (that is, the average of 90% and 70%) at a listing age 210 of 11 days (that is, the average of 10 and 12).

In some embodiments, the pricing module 138 may analyze sales of the seller 104 as just described, by moving across the X axis using a window 301 of a predetermined size. The window 301 may have a length of 5 days (as shown in the example of FIG. 3), 10 days, or any other time period. The pricing module 138 may analyze sales data of the seller 104 to determine if a seller reduction point 304 should be created in the window 301, as the window 301 steps across the X axis in 1 day increments (or any other increment).

In some embodiments, the number of sales in the window 301 must be greater than a threshold over a predetermined time period in order to generate a seller reduction point 304 in the current position of the window 301. The predetermined time period may be 1 month, 3 months, or any other time period. Referring again to the example of FIG. 3, assume the window 301 is currently positioned over days 9 to 13 of the X-axis, and the threshold is 10. In this case, the pricing module 138 would not create the seller reduction point 304A since the number of sales (2) are less than the threshold (10) within the window 301 as currently positioned on the X-axis. However, if the threshold was 2, a point would be created by averaging both the X and Y values as described above, resulting in a point at 11 days and 80%, as shown in FIG. 3.

In some embodiments of FIGS. 2 and 3, only a limited number of data points may be present. In this case, based on the type of trend-line, regression can be used to generate a fitting-equation for the curve 302 that will be used as described later. As shown in FIGS. 2 and 3, because the data follows a linear pattern, a linear trend-line may be created. However, in other cases, data may follow an exponential or logarithmic pattern, for either curve 202, curve 302, or both. In this case, based on the type of trend-line, linear, exponential, or logarithmic regression can be used with the data points in FIG. 3 (as generated by averaging proximate data points in the moving window described above) or with the data points in FIG. 2 (generated from averaging percentages of original price sold (Y) for past sales at particular ages of listing (X)). With such a generated curve, the percentage of original price sold (Y), with respect to both category decay (FIG. 2) and seller flexibility (FIG. 3), can be predicted at any given age (X) of a listing.

Figure 11:
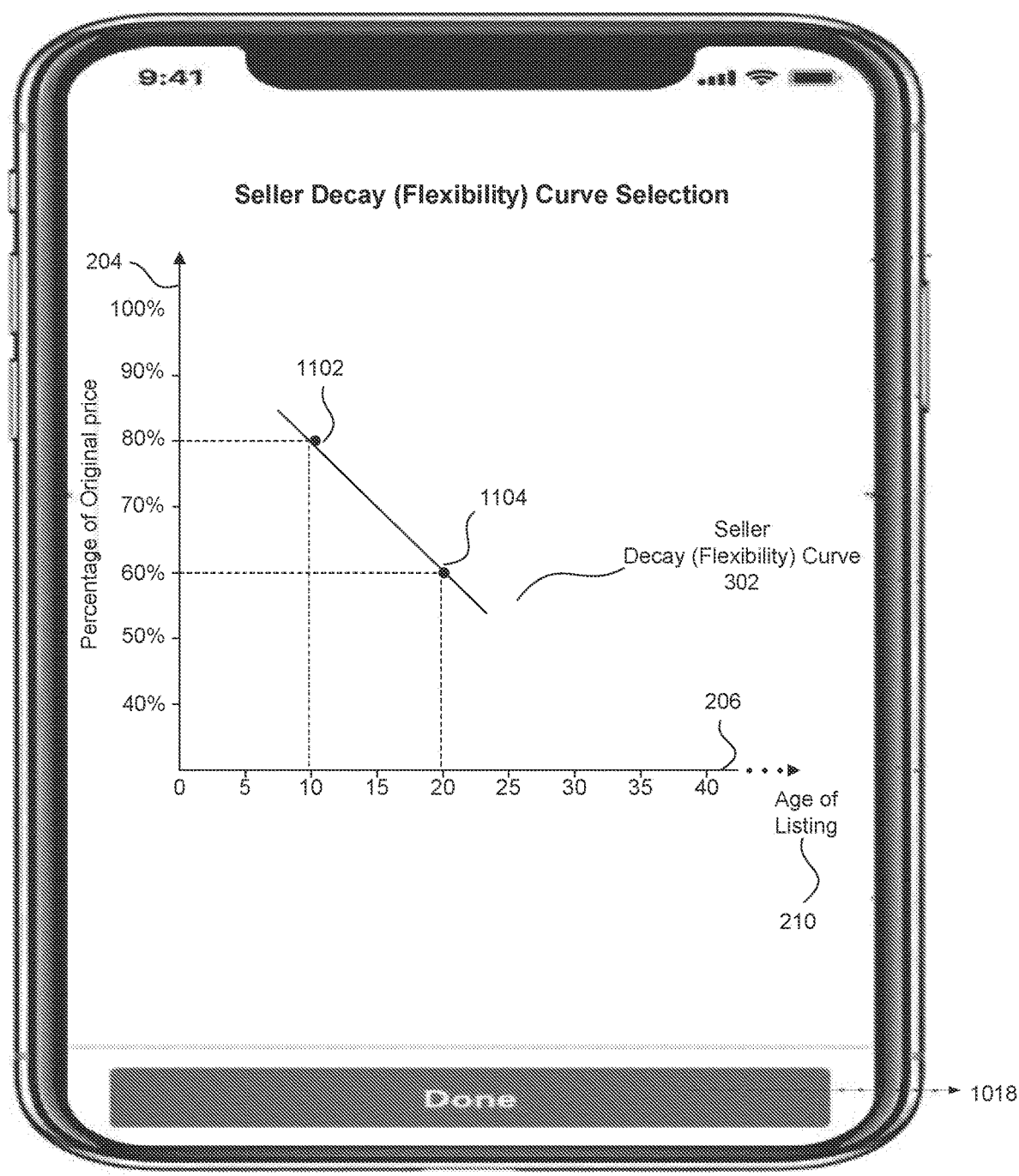
FIG. 11 provides an example graphical user interface (GUI) used for gathering data points from a user to construct a seller flexibility curve, according to some embodiments.

In some embodiments if not enough seller reduction points (such as point 304 described above) can be created to depict an accurate curve, the user may also be asked themselves what they feel their flexibility may be. Alternately, the curve previously created through regression as described above may be presented to the user in a GUI such that the user may alter the curve as needed to reflect what they feel their true flexibility may be. In both embodiments, a GUI as shown in FIG. 11 may be presented to the user. For the embodiment where there are not enough seller reduction points to depict an accurate curve, the screen may start with no points, or may display the seller reduction points that already exist. Then, at regular predetermined intervals (e.g., every 10 days, where the age of listing 210 indicates days in FIG. 11), a point may be presented to the user (e.g., points 1102 and 1104 in FIG. 11) wherein the user may be able to place the point on the Y axis at a percentage level they may feel comfortable lowering the original price by. For example, point 1102 may first be presented to the user, and if they feel comfortable selling for 80% of the original price at an age listing of 10 days, they may drag the point 1102 along the Y-axis to the 80% location. If 1102 is an already existing seller reduction point at, e.g. 70%, and the user instead feels comfortable with 80% (meaning 70% is too low for them), similarly, they may drag the point 1102 along the Y-axis to the 80% location.

In this manner, in such an embodiment, the user is free to generate their own curve at pre-determined intervals, or adjust an already-existing curve, as the need may be. This is beneficial as it may reflect current exigencies which may not be captured by a trend. For example, if a user is getting married soon, will be bankrupt by a certain death, has a death in the immediate family, or by any other unforeseen circumstance urgently needs money by a certain date, the actual curve which a user is comfortable with may tend to be more steep, with a greater negative rate of change, than a predicted curve. Conversely, if the user has had a sudden infusion of cash due to an unforeseen circumstance, such as, a gift from a family or well-wisher, they may not be in a hurry to sell, and the curve which they are comfortable with may be less steep, with a lower rate of negative change, than a predicted curve. In this manner, the user can account for their personal circumstances, taking the predicted curve as guidance, and adjust it to their needs as they see fit. The curve may then be interpolated. between the points chosen by the user (for example, if the interval at which points are presented is every 10 days as described above, then the user chooses 4 seller reduction points in FIG. 11 defining the curve) using linear, exponential, or logarithmic regression, or a combination of the three, depending on the type of the curve. This curve may then form the seller flexibility curve 302 that will be used to generate an optimal price or initial offer price, or adjust an initial offer price over time, along with the demand curve 202, as will be described below.

In some embodiments, a single seller flexibility curve 302 may be generated for a given seller 104 that covers all the categories 152. In other embodiments, multiple seller flexibility curves 302 may be generated for a given seller 104, with each seller flexibility curve 302 covering one of the categories 152. A single seller flexibility curve 302 can be useful when there is not much data present for a specific category 152 for sales for a particular seller. In addition, a single seller flexibility curve 302 can also be useful when sales for a new product are expected to follow a usual trend. For products with unique or unusual sales patterns (seasonal, luxury brands, etc.), a particular category 152 seller flexibility curve 302 may be useful.

Example embodiments for generating and using category decay curves 202 and seller flexibility (decay) curves 302 are provided in U.S. patent application Ser. No. 16/253,719 titled "Temporal Disposition Of Offers Based On Decay Curves," filed Jan. 22, 2019, which is herein incorporated by reference in its entirety, and any of those embodiments may be used herein.

Automatic Generation of Listings and Pricing Generation

As noted above, sellers 104 may create listings 112 on the site 110 to sell their FSOs 112. The quality of such listings 112 can vary greatly, and may depend on a number of factors, such as the user's experience creating listings, the information the user has on the item (such as make, model, brand, condition, size, color, features, etc.), the user's photo taking skills, whether the user is rushed when creating the listing, whether this is the first time the user has ever tried to sell an item of this type, etc. Also, the creation of listings 112 may not be an intuitive or easy task for many sellers 104. These factors may result in deterring many sellers 104 from creating listings 112, such that their FSOs 106 are not offered for sale on the internet site 110.

Thus, in some embodiments, the internet site 110 includes a listing module 134. Upon command from a seller 104, the listing module 134 automatically creates a listing 112 to sell the seller 104's FSO 106. The listing module 134 intelligently creates the listing 112 by customizing the listing 112 to the seller 104's particular FSO 106, as well as specifications 154 received from the seller 104.

For example, one seller 104 may wish to maximize the sale price 122 that his FSO 106 ultimately sells for, and may not be as concerned with how long the FSO 106 takes to sell. Such a seller 104 may indicate such a specification 154 on a GUI such as GUI 1000 of FIG. 10. For example, in GUI 1000, there is a slider 1018 presented to the user between "Maximize Profit" and "Maximize Time [Sell at an earlier time]," wherein the seller 104 can indicate that he/she would like to maximize profit at the cost of potentially waiting for some time before the FSO is sold. Such a visual form for indicating the preference as a slider 1018 represents an intuitive and easy-to-use feature for the seller 104 to use. Another seller 104 may wish to quickly sell her FSO 106, or sell her FSO 106 within a designated time frame, provided that the sale price 122 is above a given minimum price. In this case, conversely, such a seller 104 may position slider 1018 on GUI 1000 such that it is located at the "Maximize Time" end. Another seller 104 may specify that her FSO 106 is being sold for one or more specified charities. Such a charity may, e.g., be chosen from a drop-down box 1022, as shown in GUI 1000, where "Charity A" and "Charity B" are listed. The drop-down box selections may further be text-editable, such that the user may write-in the charity of their choice as an additional drop-down field if it is not already present. The selections made by the user are stored and sent from the user application as inputs of specifications 154 to the listing module 134.

The listing module 134 (operating in conjunction with a charity module 136 when the seller 104 has designated the sale of the FSO 106 for charitable contribution) receives these specifications 154 from sellers 104, and automatically and intelligently creates the listings 112 for the respective FSOs 106 based on these specifications of sellers 104.

As part of this automatic listing 112 creation function, the listing module 134 may operate with the pricing module 138, for automatically and intelligently generating an offer price 404 for a particular FSO 106 (herein called the FSO 106 being offered for reference purposes) that an associated seller 104 wishes to sell. To generate the offer price 404, the pricing module 138 may take into consideration the seller 104's specifications 154, the category decay curve 202 associated with the category 152 of the FSO 106 being offered, the seller 104's flexibility curve 302, and/or past listings 116 for FSOs 106, either in general or having the same or similar category 152 of the FSO 106 being offered.

example, such past listings 116 may indicate that the same or similar FSOs 106 sold for an average price of $10. In an embodiment, the pricing module 138 may thereby suggest an optimal offer price 404 of $10. Or, instead, the pricing module 138 may also take into consideration the category decay curve 202 associated with the category 152 of the FSO 106 being offered, and/or the seller 104's flexibility curve 302.

For example, the seller 104 may inform the pricing module 138 (via the specifications 154) that the seller 104 wishes to sell within 20 days of the age of the listing. This may occur, for example, through the editable text field 1016 and check-box 1014 present on GUI 1000 of FIG. 10. For example, the seller 104 may write "20 days" in the text field 1016 and check the box 1016 to indicate that such a sell-by condition is valid and should be incorporated as part of the specifications 154. It is assumed the example category decay curve 202 shown in FIG. 2 applies to the category 152 of the FSO 106 being offered. In the example of FIG. 2, decay point 208B of 80% is closest to listing age 210=20 days. Thus, the pricing module 138 may pre-apply this decay point 208B—that is 80%—to the optimal price thereby suggesting an offer price 404 of $8 (that is, 0.8×$10). As will be explained below, the seller flexibility curve 304 associated with the seller 104 can also or alternatively be applied in the same way to generate the offer price 404.

In addition, in an embodiment, when the price is suggested to the seller, a forecasting via an associated demand curve can also be shown. That is, several prices and demand curves may be shown, in a similar manner as the seller flexibility curve in FIG. 11. In this manner, not only the demand curve for the optimal price of $10 in the example above, but also other prices can be shown with different demand curves corresponding to these different prices, in order to give the seller 104 a range of options. In such an embodiment, the demand curve 202 of FIG. 2, based on past listings 116, may be shown as corresponding to the optimal price of $10, with the point 208B indicated as corresponding to the suggested offer price of $8 on the demand curve 202.

However, additional demand curves can also be shown, with steeper-sloped curves corresponding to higher prices than the optimal price, and lower-sloped curves corresponding to lower prices than the optimal price. For example, in the example above, if the FSO 106 was priced at $40 instead of $8, the rate of change in order to sell the product in 20 days, based on past listings 116, would need to be much steeper than $10 as for the curve in 202. As a result, a steeper curve would be shown along with the option of a $40 initial price to indicate to the user how far they would need to drop to match the trend in reduction of price of past listings 116 in order to sell the product by 20 days. Similarly, if the FSO 106 was priced at $9 the rate of change in order to sell the product in 20 days would be much less, based on past listings 116, than it would be with the original optimal price of $10. As a result, the user can determine an option that is more suitable for them. Furthermore, in an embodiment, the user can input their own offer price (field 1004 of GUI 1000 in FIG. 10), and a corresponding demand curve, relative to the curve 202 of the optimal offer price (steeper or lower sloped as described above), may be shown in a GUI similar to the GUI of FIG. 11. In this manner, the seller 104 can see for themselves how far off from the decay curve 202 they are if they refuse the suggested offer price, and would like to use a higher or lower initial offer price instead.

In some embodiments, the listing module 134 may automatically create multiple listings 112 for the FSO 106, in order to enhance the sellability of the FSO 106 on the site 110. This is called parallelizing the sale of the FSO 106, and is further described below.

Smart Nudge Engine and ZOPA

By operating as described above, the pricing module 138 may automatically generate an offer price that is an optimal price based on the specifications 154 provided by the seller 104, and the characteristics of the FSO 106 being offered. But the seller 104 may ultimately select an initial offer price 404 that is higher than the optimal price generated by the pricing module 138. In this case, in some embodiments, the listing module 134 will post the listing 110 on the site 100 using the initial offer price 404 provided by the seller 104 (rather than the optimal price generated by the pricing module 138).

This scenario is shown in the example of FIG. 5, where the seller 104's initial offer price 404 (which is shown as the original price 504 in FIG. 5) is higher than the optimal price 506 that was automatically generated by the pricing module 138. Often, because of this price difference, it is possible (and even likely) that the FSO 106 being offered will not sell quickly or at all, or sell within the specifications 154 provided by the seller 104 (such as selling within a specified period of time). Accordingly, the site includes a smart nudge engine 140 to help the seller 104, over time, intelligently lower the offer price 404 of the FSO 106 being offered. In other words, the smart nudge engine 140 operates to, over time, "nudge" the seller 104 to offer prices 404 that are within zones of possible agreement (ZOPA) 508, As illustrated in the example of FIG. 5, a ZOPA 508 is a price range where the seller 104 and buyers 108 may agree on a price for the FSO 106 being offered. The smart nudge engine 140 may generate ZOPA. 508 for a given seller 104 and category 152 of FSO 106 based on the seller 104's flexibility curve 302 and/or the applicable category decay curve 202. Specifically, as discussed above, the category decay curve 202 indicates the percentage discounts below the original offer price that sellers 104 and buyers 108 were able to reach agreement at various listing ages 210 for a given category 152. The seller flexibility curve 302 indicates, for a given seller 104, the percentage discounts below the original offer price the seller 104 was willing to make at various listing ages 210. The smart nudge engine 140 may use these curves 202, 304 (either individually or in combination) to generate ZOPAs 508 for the seller 104 and the category 152 of the FSO 106 being offered at different listing ages 210.

For example, the example category decay curve 202 in FIG. 2 indicates that, for the category 152 of the FSO 106 being offered, sellers 104 and buyers 108 were able to reach agreement at 80% of the original offer price at listing age 210=15 days. Also, the example seller flexibility curve 302 in FIG. 3 indicates that, at listing age 210=15 days, the seller 104 associated with the FSO 106 being offered was often willing to drop the offer price to about 70% of the original offer price. Accordingly, in this example, the smart nudge engine 140 may generate a ZOPA 508B at listing age 210=15 that ranges from the optimal price 506 to somewhere between 70% to 80% of the seller 104's original price 504. In an embodiment, the average percentage discount corresponding to the same listing age, on the category decay curve 202 and the seller flexibility curve 302, may be used. In this case, the average would be 75%.

In an embodiment, the upper range of the ZOPA may be set based on a predicted range of the price estimation model, which will be described below according to three overall paradigms. Any of these three paradigms, or any combination of these paradigms, may be used to generate an upper range of a ZOPA to be used.

Alternatively, the upper range of the ZOPA may also be set based on the average price of listings 116 for a particular category 152 wherein such an average price of listings 116 may be adjusted over time according to an average price drop curve, such as the curve 202 described above. In a further embodiment, such average prices and price drop curves may be generated for each brand and category pair, if there are more than a predetermined number of past listings 116 providing enough data in such a respective brand and category. For example, if there were more than a predetermined number of past sales of a particular make of a product (a bag of brand A), then the average price of all listings 116 of bags of brand A may be used as a starting upper bound for the ZOPA, which may be adjusted per the average price drop curve to reach an optimal offer price 506.

ZOPAs 508 may be stored in a ZOPA database 132 in the site 110. (It is noted that the ZOPAs 508 in FIG. 5 are provided for illustrative purposes only, and are not necessarily drawn to scale.)

For the first example described above, as listing age 210=15 approaches, the smart nudge engine 140 may encourage the seller 104 (via emails or texts, for example) to reduce the offer price 404 to be within the ZOPA 508B that is applicable at this listing age 210. Or, the seller 104 may instruct the smart nudge engine 140 to automatically adjust the offer price 404 so that it is within the ZOPAs 508 applicable to respective listing ages 210.

As noted above, the listing module 134 may automatically create multiple listings 112 for the FSO 106 being offered. In some embodiments, the listing module 134 will have different offer prices 404 for these listings 112. For example, the offer price 404 for one of the listings 112 may be the seller 104's original price 504, and another may be closer to the optimal price 506 (but at least equal to the minimum price that the seller 104 provided as part of the specifications 154). The smart nudge engine 140 may adjust these offer prices 404 into the applicable ZOPAs 508 (to the extent they do not already fall in the ZOPAs 508) as the listing age 210 of the listing 112 progresses over time.

Furthermore, as will be explained below, in an embodiment, monitoring of the optimal price 506 occurs periodically as the age of the listing increases. As a result, the optimal price 506 itself may change over time. For example, as opposed to the constant Optimal Price axis 506 shown in FIG. 5, the optimal price for ZOPA 508B and 508C may each be different from the optimal price at ZOPA 508A. Factors associated with artificial intelligence evaluation of the optimal price may be evaluated over time, or alternatively, a statistical approach may be taken, and the value of the optimal price 506 may shift over time as the age of the listing 210 increases. Both approaches will be described below, with regards to the flowchart of FIG. 6.

With the embodiment of the shifted value of the optimal price 506, in a further embodiment, an aggressive approach may be taken to help the seller reach the optimal price 506. An example will be described with regard to the ZOPA 508B. For example, in an embodiment, the optimal price upon reaching 15 days for the age of listing, at ZOPA 508B, may be lower than the optimal price 506 at 5 days, in ZOPA 508A. The optimal price may be periodically evaluated at a time period of a predetermined number of days (e.g., 5 days). In this case, from the time period of ZOPA 508B (15 days after the listing) until the next evaluation of optimal price 506 (20 days after the listing using the above example of a time period of 5 days), the smart nudge engine 140 may break the entire ZOPA 508B into 4 intervals (P1-P2, P2-P3, P3-P4, and P4-P5), and 5 values, P1-P5, as shown in FIG. 5.

The first value P1 may correspond to the already-calculated interpolation between the demand curve 202 and the seller flexibility curve 302, which in the above example for ZOPA 508B is around 75%. The last value P5 would be the adjusted optimal price 506 for 15 days, which as described, may be different for the optimal price at 5 days. Accordingly, the second, third, and fourth values (P2-P4) would be calculated between the first and last value at one-fourth, one-half, and three-fourths of the interval from the first value to the last value (intervals not drawn to scale in FIG. 5).

Thus, in the 5 day interval from 15 days of the listing, until the next optimal price evaluation 506 at 20 days, these values of P2, P3, P4, and P5 may be suggested on days 16, 17, 18, and 19, to the user, respectively. In this manner, an approach may be taken where the user is encouraged to lower the offer price, wherein the optimal price 506, which would be most beneficial for the user in terms of both time and profit, is also suggested.

However, in some embodiments, the intervals suggested to the user may be altered. At each optimal price 506 evaluation period (e.g. 15 days, 20 days, 25 days, etc.), the seller's original price may be subtracted by the seller's flexibility curve at the age of listing corresponding to each respective evaluation period (e.g. seller's original price minus seller's flexibility curve value at 15 days for the evaluation period at ZOPA 508B, seller's original price minus seller's flexibility curve value at 20 days for the next evaluation period, etc.)

If this figure subtracted by the newly evaluated optimal price 506, at each evaluation period, exceeds a certain threshold, this may indicate that the seller's expectations are very far from optimal, and thus the seller may refuse if a large change in price is suggested. As a. result, in such a case, P2 may be suggested at days 16 and 17, and P3 may be suggested at days 18 and 19. In this manner, the smart nudge engine 140 may be geared to only suggest changes that are palatable to a seller given their individual flexibility.

Figure 6:
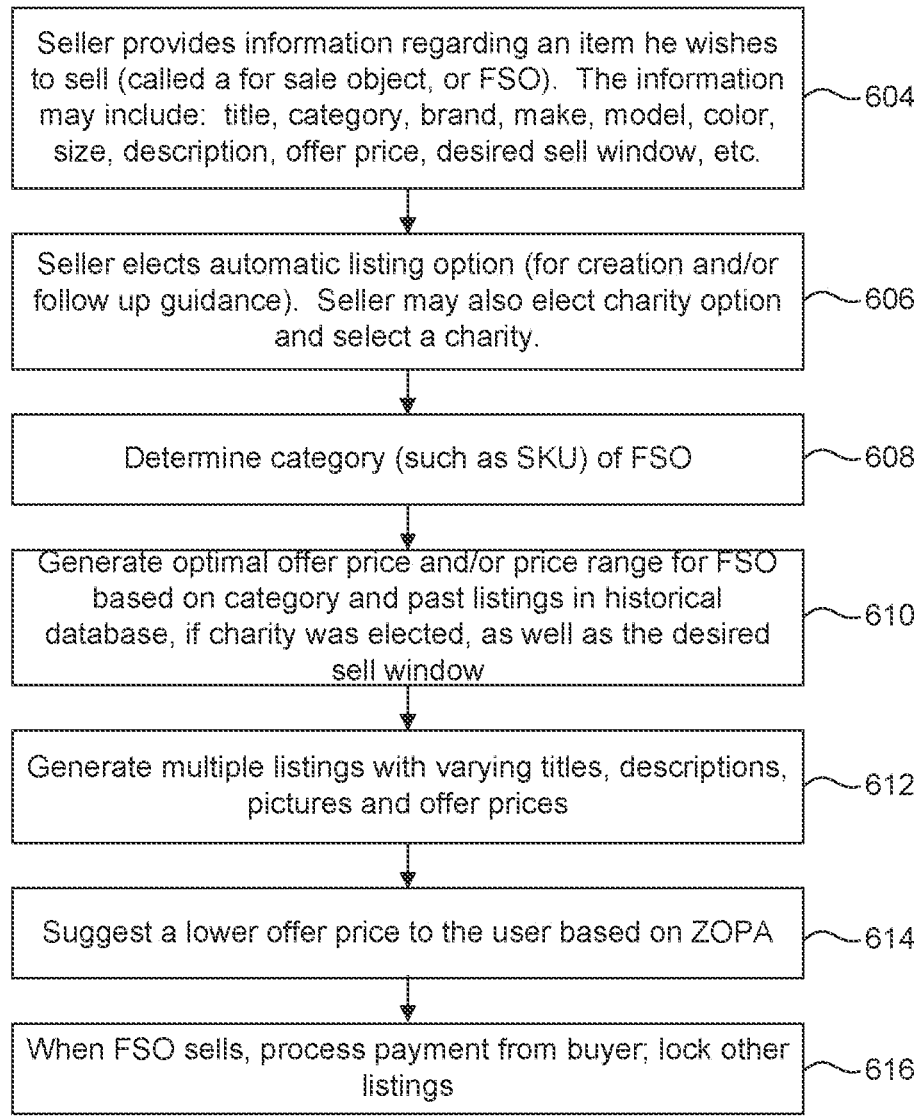
FIG. 6 illustrates a flowchart of a method for using computer technology to provide pricing guidance, and to intelligently create and process listings for selling FSOs, according to some embodiments.

FIG. 6 is a flowchart for a method 602 for using computer technology to provide pricing guidance, and to intelligently create and process listings 112 for selling FSOs 106, according to some embodiments. Method 602 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art. Method 602 shall be described with reference to FIGS. 1-5. However, method 602 is not limited to those example embodiments.

In 604, the seller 104 provides information to the site 110 regarding a FSO 106 (referred to as the FSO 106 being offered for reference purposes). The information may include, for the FSO 106 being offered: the title, category of product, brand, make, model, condition, color, size, pictures, description, etc. At step 604, the seller 104 may also provide specifications 154 pertaining to the sale, such as an initial offer price (corresponding to field 1004 on GUI 1000 of FIG. 10), a minimum sale price, a desired sell window (that is, a date by which time the seller 104 wishes the FSO 106 to sell, corresponding to field 1016 on GUI 1000), etc.

In 606, the seller 104 also elects an automatic listing option, to instruct the site 110 to automatically create listing(s) 112 for the FSO 106 being offered. The seller 104 may indicate that the FSO 106 is being sold for charity (e.g., by choosing a charity from a drop down box 1022 in one embodiment, as shown in GUI 1000 of FIG. 10), and identify one or more charities to receive the proceeds of the sale. The website 110 in the charity 136 module may have stored in this module the collection drive dates of the respective charities shown in the drop-down box 1022. Thus, for example, if the user has selected a charity which may have a collection drive date that is soon forthcoming, within a predetermined threshold number of days (e.g., within 50 days), then the pricing module 138 may automatically pre-select the checkbox 1014 to indicate a sell-by window to be checked.

In addition, the pricing module 138 may fill in the editable field 1016 with the number of days until the next collection drive date (50 days in the example above) along with an explanation of why "(before the next charity collection drive)," so that the seller 104 upon examining the GUI 1000 may intuitively determine why the checkbox 1014 is already checked. In this manner, the user can be aided in trying to sell in an efficient manner so that their FSO 106 can be of benefit to the charity as soon as possible. Such information as collective drive dates of listed charities in drop down list 1022 may be obtained from external databases, the internet, in an autonomous manner, or may be manually input by a seller 104 on GUI 1000, etc.

In 608, the listing module 134 determines a product category 152 (such as the stocking keeping unit, or SKU) of the FSO 106 being offered. The listing module 134 may do this even if the seller 104 provided the category in 604 (since the seller 104 may not have provided the correct category). The product category 152 may be analyzed on the basis of past listings 116, including when the product was sold as part of price history 124, disclosed above, to determine if sales of the product might be seasonal or perishable.

For example, a majority of heavy jackets may be sold in the winter months (in-season), and a minority of these jackets may be sold in the summer months (off-season). In the case of an item in such a category 152 being offered for sale in-season, to maximize profit it should be sold before the in-season period is over. As a result, e.g., if more than a threshold percentage of past listings 116 of a category 152 were sold within a particular season or time, then a seasonality Boolean variable associated with a listing 112 may be marked as true.

In such a case, an end of such a season or time, based on the date past listings 116 in the same category 152 were sold, may be tabulated. This date may then be filled in field 1016 of GUI 1000, and the checkbox 1014 may be checked to indicate a sell-by condition. For example, in the above example of heavy jackets, the number of days until spring may be written in the editable field 1016 along with an explanation "(before the season is over)" so it is intuitive to a seller 104 why a sell-by condition has been pre-filled out.

A further example may be a food item, or an item with a limited shelf-life. In the case of these items, sales may not be seasonal, but instead when examining the price history 124 of past listings 116 in the same category 152, the number of days from the initial offer price until the sold date may be analyzed. If the number of days in this calculation is less than that for other categories 152 on average by a certain threshold, then a determination of a perishable or limited-shelf-life item might be made. Additionally, such properties may also be pre-input e.g., by having a perishability Boolean variable associated with a listing 112 marked as true, where such a Boolean variable might be true for the entire category 152 (non-vegetarian food, etc.)

In such a case, the number of days from the initial offer price until the sold date for past listings 116 in the same category 152 may be calculated on average, and a sell-by condition using such a calculated figure may be pre-filled out in GUI 1000. For example, the editable text field 1016 may contain this calculated figure, along with the explanation "(before the product's shelf-life is over)" with the box 1014 checked. In this manner, it is intuitive to the seller 104 that the box is checked for a sell-by condition to account for the perishable nature of the item.

The listing module 134 may determine the category 152 of the FSO 106 being offered by analyzing the information provided in 604. For example, the listing module 134 may analyze the pictures using image recognition techniques, algorithms, methods, modules, components, software and/or other technology to identify the category 152 of the FSO 106 being offered. Example embodiments for automatically identifying the category 152 of FSOs 106 are provided in U.S. patent application Ser. No. 16/288,379 titled "Probabilistic Item Matching And Searching," filed Feb. 28, 2019, which is herein incorporated by reference in its entirety, and any of those embodiments may be used herein for automatically determining the category 152 of FSOs 106.

In 610, the pricing module 138 generates an optimal offer price 506 for the FSO 106 being offered. As discussed above, to generate the optimal price 506, the pricing module 138 may take into consideration the seller 104's specifications 154, the category decay curve 202 associated with the category 152 of the FSO 106 being offered, the seller 104's flexibility curve 302, and/or past listings 116 for FSOs 106 having the same or similar category 152 of the FSO 106 being offered. The pricing module 138 may analyze the listing information of the FSO including any of the title 402, description 406, category 408, brand 412, condition 414, pictures 410, etc., using artificial intelligence techniques, algorithms, methods, modules, components, software and/or other technology to identify an optimal offer price 506 of the FSO 106 being offered (The listing module 134 may suggest the optimal offer price 506 to the seller 104 to be the offer price 404 for at least one of the listings that are generated in step 612, which is described below.)

Figure 7:
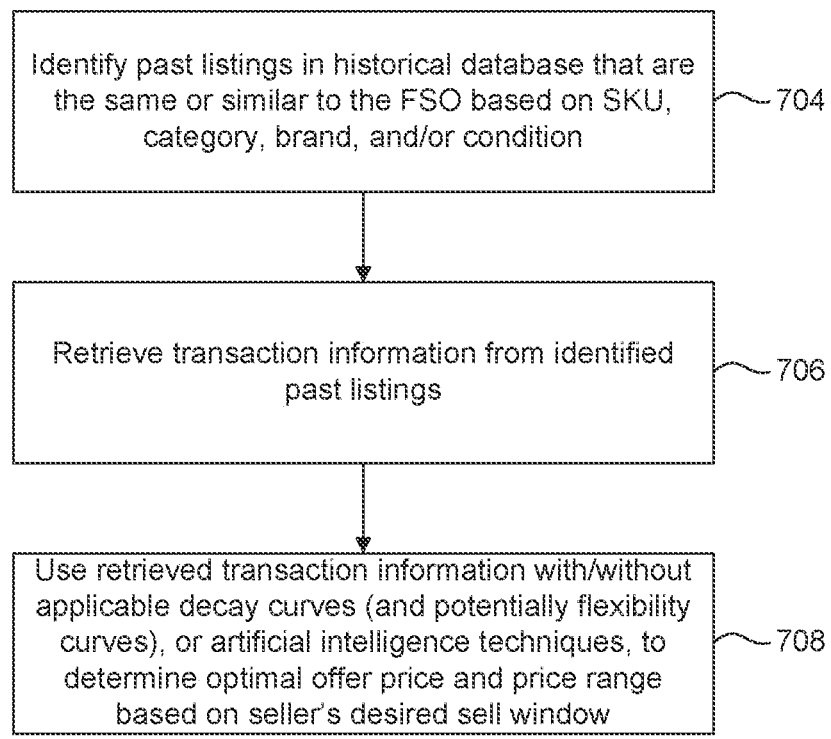
FIGS. 7-9 provide more details of the method of FIG. 6, according to some embodiments.

An example of such processing for step 610 is shown in a flowchart 702 of FIG. 7, with respect to a sell-by condition specified by a seller (e.g., through GUI 1000 as described above). In 704, the pricing module 138 identifies past listings 116 from the historical database 114 of FSOs 106 having the same or similar SKU, category 152, brand, condition, or any of the listing information parameters in FIG. 4, or any of the tabulated parameters as will be described below as the FSO 106 being offered.

In 706, transactional information 118 from those identified past listings 116 is accessed and retrieved.

In 708, the pricing module 138 uses (1) the retrieved transactional information 118, (2) the category decay curve 202 associated with the category 152 of the FSO 106 being offered; (3) the seller flexibility curve 302 associated with the seller 104; and/or (4) artificial intelligence techniques, to generate the optimal offer price 506 and associated price range.

These will be described herein with regard to three example overarching paradigms. Firstly, past listings with the same SKU as the FSO 106 may be identified. If there are a substantial number of such past listings 116 present, these may capture trends in a focused dataset, even within a category. For example, in the heavy jackets category, a vest may have different sale characteristics than a normal heavy jacket. Because such vests may have a common SKU, any such trends may be captured in analyzing their transaction information 118, collectively.

For these past listings 116 with the same SKU, if box 1014 is checked in the GUI, these listings may optionally first be narrowed down based on the field 1016 inputted from the GUI 1000. For example, if the field 1016 has a value of 0 days, this may indicate that the user would like to sell the product immediately. In this case, past listings 116 with the same SKU as the FSO 106 may be excluded, except for those listings which have a sold date that is proximate to the initial offer price date (within a predetermined number of days, e.g. 5 days). In this manner the dataset is limited to those samples which have a desired time window corresponding to a high degree to a seller 104's request per field 1016. In another example, if the field 1016 has a value of 20 days, this indicated that the user would like to sell the product within 20 days. Accordingly, past listings 116 with the same SKU as the FSO 106 may be excluded, except for those listings which have a sold date that is a predetermined number of days (e.g., 3 days) before or after 20 days (i.e., the sold date is 17 days-23 days after the initial offer price).

Alternatively, for the example with a sell-by condition per field 1016 of 20 days, instead of excluding listings as is done above, the previous listings 116 with the same SKU as the FSO 106 may be considered to generate an initial optimal price. Then, this initial optimal price may be altered via the previously generated demand curve 202 or seller flexibility curve 302 to generate an adjusted optimal offer price taking into account a seller 104's sell-by condition. In an embodiment, the generated demand curve 202 may be altered to only take into account previous listings 116 in the same category 152 that have the same SKU as the FSO 106.

Once the past listings 116 with the same SKU (including any exclusions described above) are accounted for, median and inter-quartile range analysis may be run on such data (e.g., the sold price of such past listings 116) to capture the middle 50% of sales in terms of sold price. Then, the median price value of these values may be reported as the optimal price, with the inter-quartile range as a price range. Alternatively, especially in the case of a skewed distribution, the mean sale price of the listings in the first quartile to third quartile (the middle 50% of sales) may be averaged, and this averaged value may be reported as the optimal offer price, along with the inter-quartile range as a price range. For example, as explained above, the retrieved transactional information 118 may indicate that the FSOs 106 with the same SKU sold for an average price of $10 in the first quartile to the third quartile (the middle 50% of sales). The pricing module 138 may thereby suggest an offer price 404 of $10, along with the respective inter-quartile range. In this case, the interquartile range serves as a useful measure of variability.

In the alternate embodiment above where the initial optimal offer price is adjusted per the generated demand curve 202 or seller flexibility curve 302 taking into account a seller 104's sell-by condition, the further step of adjusting the median/mean price value occurs. In the above example where the seller 104's sell-by condition is 20 days, the percentage of original price is tabulated at the 20-day-mark using the demand curve 202 and the seller flexibility curve 302.

If the price percentage value of the seller flexibility curve is lower than the demand curve at 20 days, then the demand curve value may be used (since the seller will not have to go lower in price than the demand curve based). For example, if the demand curve 202 indicates that similar sales of previous listings in the category 152 (and possibly with the same SKU as per the embodiment of the demand curve 202 described above) settled at 70% in 20 days, and the seller flexibility curve indicated that the seller was okay with going as low as 60%, then the demand curve value may be used since the seller may not have to go as low as 60%.

In this case, the value of 70% of the initial optimal price (calculated as the median/mean above) may be output as the adjusted optimal offer price, with the same inter-quartile range given, but shifted also by 30% of the initial optimal price. That is if the inter-quartile range was initially ($8, $12), with the initial optimal price at $10, and the initial optimal price is adjusted to $10−$3=$7, then similarly the interquartile range is shifted to ($8−$3,$12−$3), which is ($5,$9).

However, if the seller flexibility curve is higher than the demand curve for the sell-by date (e.g. 20 days), this means that the seller is not quite as flexible as market demand. requires for settling by the sell-by date as input in 1016, with respect to previously analyzed listings 116. As a result, in such a case, the values of the seller flexibility curve and demand curve may be averaged.

This generates a "meeting in the middle" approach that bridges seller rigidity with the realities of having to sell at a lower percentage of original price in order to ensure that the FSO 106 is sold by a certain date as desired. In this manner, chances are higher that the seller may agree to such a change, rather than shifting the price all the way to what the demand curve requires (e.g., in the case above if the seller curve 302 at 20 days corresponds to 80% of the initial optimal price, and the demand curve 202 corresponds to 70%, then the average of 75% is easier for the seller to be okay with than the requirement of 70% per the demand curve).

As with the example above, the initial optimal price may be adjusted by such an averaged amount percentage to be output as the adjusted optimal offer price (e.g., 75%), and the inter-quartile range is similarly shifted by the same amount as described above.

In an embodiment, in addition to the calculating the median/mean (denoted as med_a) and interquartile range (denoted as min_a, max_a, corresponding to the first and third quartile values), a confidence threshold (denoted as ct_a) for the median or mean and such interquartile range may also be calculated. Such a confidence threshold may depend on the number of past listings 116 that are found to have the same SKU as the FS) 106, as well as the time window to get a minimum number of items. In this manner, more importance may be placed on gathering more recent data, wherein if more recent data is gathered, this generates more confidence that such a figure may be replicable in the present listing to be created. Intuitively, this makes sense, as sales data from a long time ago may not hold true in the present day due to changes in the marketplace.

The second overarching paradigm is similar to the first overarching paradigm, but instead of only analyzing past listings 116 with the same SKU, similar past listings 116 of the same category 152, brand 412, and/or condition 414 are analyzed. A sell-by condition may be analyzed in the same manner as with the first overarching paradigm. Using the second overarching paradigm thus expands the scope of past listings 116 that may be analyzed in determining the initial optimal offer price. In cases where there may not be many past listings 116 with the same SKU but there are substantial listings that are similar in terms of condition, brand, or category 152, such a paradigm would be useful.

In the same manner as with the first overarching paradigm, once the previous listings 116 have been identified, median and inter-quartile analysis is run, and depending on the previous listings 116 being excluded or not, a generated demand curve 202 and seller flexibility curve 302 may be used to adjust an initial optimal price to accommodate a sell-by condition (e.g, 20 days as described above).

This process, as with the first overarching paradigm generates a suggested optimal price of a median or mean (or adjusted median/mean) (denoted as med_b), and an inter-quartile range (denoted as min_b, max_b, corresponding to the first and third quartiles. Finally, as with the first overarching paradigm, a confidence threshold (denoted as ct_b) may be generated which may depend on the number of similar previous listings 116 found, the degree of similarity of those items identified, and the time window to get a minimum number of similar items.

The third overarching paradigm for the generation of an optimal offer price is herein described. The sequential operation of the third paradigm is shown in an example embodiment 1200 in FIG. 12. Operation of this sequence will first be described with respect to a neural network type of regression model, but it is understood that analogous steps would be applied to both the random forest regression model and the boosted decision tree regression model.

First, as shown in the flow diagram 1200, text data 1202 is taken as input from a seller 104, comprising any combination of a listing description 405, a listing title 402, a listing category name 408, and a listing brand name 412. All of these inputs are considered to be textual input.

In order to convert the input from textual input in 1202 to a usable form by any of the regression models present in block 1212, the textual input in 1202 must be tokenized. In order to tokenize the textual input in this manner, algorithms such as term frequency-inverse document frequency (Tf-idf), Bag-of-words, and word2vec may be used, as shown in block 1208 where the arrow from 1202 to 1208 depicts the step where textual input is fed as input to such an algorithm to result in tokenized output. That is, by applying such algorithms to the textual input data 1202, such data input results in numerical output, which may be useful to a regression model. In its original text form, such inputs are unusable by the regression models.

Figure 13A:
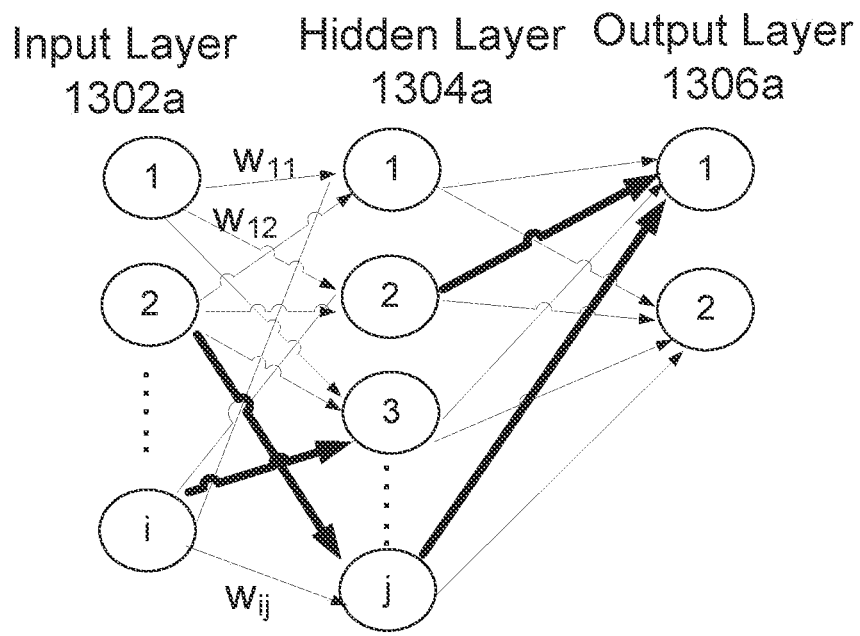
FIG. 13A shows an example of a regression model that may be used for gathering various further input data that is needed for predicting price according to some embodiments.

In an embodiment a neural network model with hidden layers and backpropagation as shown in FIG. 13A may be used in the tokenization step to convert textual input to tokenized input. The inputs in this case would be the text keywords in the form of the description 405, listing title 402, listing category name 408, and listing brand name 412, where each of these inputs may have its own designated model. By using such a classification technique, it may be possible to create a system of nodes with weights. This system of nodes with weights may be used to give a reliable prediction of a numerical score for the user's input.

The different components of the neural network model shown in FIG. 5B will herein be explained, according to some embodiments. The input layer 1302a contains nodes 1 to which represent inputs into the model. Each of these nodes corresponds to a different aspect of the string entered. In particular, a string value, as inputted in 405, 402, etc., is first tokenized into words, and the tokenized words are stemmed.

Training data may be used (from previous descriptions 405, listing titles 402, etc.), where full sentences of the string value may be transformed. Such a transformation may tokenize each word, create word stems, etc. After enough training data is used, there may be a collective library of word stems, some of which are associated with only one type of brand, product titles of a certain category, listing titles of a certain category, or descriptions of a certain category.

For example, if a description is related to a brand of particular designer handbag, it may contain unique word stems that are only present in such a category. Thus the weightage of words may be different depending on their multiplicity, appearance across multiple categories, etc., such that when an input string in 402, 405, 408, or 412 is parsed apart, one input node may correspond to each word of such a string. Then, these nodes can be compared to the library of word stems associated with past descriptions 405, listing titles 402, listing category names 408, or listing brand names 412.

For example, if Ugg Boots is a company headquartered in Australia, the stem 'Aus' may be in the library of word stems array associated with the category 408 of shoes or boots, Thus if the user enters "Wearable contraption from Australia" as the input string in description 406, node 1 of the input layer 1302a for the neural network model for processing descriptions 406 may represent the word stem "Wear", node 2 may represent "contraption", node 3 may represent "from," and node 4 may represent the word stem "Aus." These nodes may then be compared to the word stems from the training library (called "bag of words"), wherein nodes 1 through 3 maybe assigned the value 0 if they do not match up with any word stems in the bag of words, and node 4 may be assigned the value 1 if it does match up with a word stem in the bag of words (in this example it matches 'Aus' from above for previous listings of Ugg Boots).

In practical terms, the input is parsed through and correlated with a series of 0's and 1's where 1's correspond to words that are in the bag of words. The bag of words may be assembled by parsing through word stems from previous listings 112 for the titles 402, descriptions 406, categories 408, and brands 412. In an embodiment, the bag of words may be for previous listings in categories 408 that are deemed similar. In the above example, the bag of words may take into account all previous listings 112 in the categories of footwear (shoes, boots, athletic cleats, etc.) for forming a bag of words. Alternatively, a bag of words may be created for previous listings in all categories 408.

Through repeated rounds of the neural network being trained with training data, each stem may have a different weight $w_{ij}$ associated with the stem going to the next layer, and eventually to the output layer 1306a. This is because some words in the bag of words may have a stronger association with particular descriptions, titles, categories, or brands based on the type of product offered, and thus may be more important than others. Importance may be gauged by several metrics in this regard as well. A stronger association for bag-of-words may be gauged based on the multiplicity and appearance of a word stem over multiple past titles, descriptions, categories, or brands for a particular type of product.

On the other hand, the tf-idf algorithm may be used in a situation where highly frequent words may start to dominate in the document (e.g. larger score) but do not contain much "informational content" to the model as rarer but domain specific words. In this case words such as "the" or "from" which may appear frequently are penalized, whereas word stems like "Aus" which may provide greater informational content because they signal a headquarter location of a company like Ugg Boots.

The metrics used are term frequency, which is a scoring of the frequency of the word in a document, and inverse document frequency, which is a scoring of how rare the word is across documents, wherein the score is a weighting. For example, the inverse document frequency of a frequent term such as "the" is likely to be low, whereas the inverse document frequency of a rare term is high. As a result, the $w_{ij}$ associated with the stem going to the next layer of the neural network model 1300a for terms that have a low inverse document frequency across multiple descriptions 406, titles 402, categories 408, or brands 412, may be weighted more highly if the tf-idf weighting algorithm is used. The word2vec algorithm of block 1208, on the other hand, represents word stems as vectors, and will not be discussed further herein.

Output layer 1306a of the neural network model 1300a may include only one node 1, containing a normalized score from 1-10. A score of 10 may indicate a high correspondence with a particular type of product and therefore correspond to a higher degree of searchability or ease-of-finding Based on the inputs and weights from each node to the other ($w_{ij}$ as shown in FIG. 5B), the results of the output layer are tabulated, and the normalized score is output to the output node 1 in the output layer 1306a. In this case. In using the tf-idf algorithm since 'Aus' may have a particular association with Ugg Boots (if Ugg Boots is headquartered there as in the hypothetical example described above), the weights from the input layer node 4 to the hidden layer 1304a may carry more weight than front the input layer nodes 1-3 to the hidden layer 1304a, as discussed above. This means, Input layer 4 may contribute in a greater manner to the normalized score in the output layer 1306a. If there are multiple nodes such as node 4, then this may contribute to a greater normalized score, wherein the normalization process occurs in comparison to previous titles 402, descriptions 406, categories 408, or brands 412 from previous listings 116. As described above, a separate scoring model may be used for the title 402, category 408, brand 412, and description 406.

In traversing from the input layer 1302a to the output layer 1306a, as shown in FIG. 13A there may also be several hidden layers 1304a present. The number of hidden layers 1304a may be preset at one or may be a plurality of layers. If the number of hidden layers 1304a is one (such as shown in FIG. 13A), the number of neurons in the hidden layer may be calculated as the mean of the number of neurons in the input and output layers.

This is derived from an empirically-based rule of thumb in ease of calculating weights across layers. According to an additional rule of thumb. In an embodiment to prevent over-fitting, where the number of neurons in input layer 1302a is $N_i$ and the number of neurons in the output layer is $N_o$, and the number of samples in the training data set of all word stems associated with the model (for either titles 402, descriptions 406, categories 408, or brands 412) is $N_s$, then the number of neurons $N_h$ in one hidden layer may be kept below $$N_h = \frac{N_s}{(\alpha * (N_i + N_o))}, \quad \text{(equation 1)}$$

where $\alpha$ is a scaling factor (typically ranging from 2-10). In this manner, the number of free parameters in the model may be limited to a small portion of the degrees of freedom in the training data. In order to prevent overfitting.

From the input layer, based on the weights from each node in the input layer 1302a to the hidden layer 1304a shown in FIG. 13A, there may be a sigmoidal transfer function in going from the input layer 1302a to the hidden layer 1304a. Initially, the weights $w_{ij}$ may be initialized to random values between 0 and 1. An input node word-stem that corresponds to a word stem in the bag of words or tf-idf algorithms may then be propagated according to these weights (forward-propagation), wherein the hidden layer 1304a forms the first outputs for the neurons of the input layer 1302a. For example, Inputs given as neuron 1 and 2 in the input layer 1302a in the example above would be multiplied respectively by 0 in the bag of words algorithm because they do not correspond to a word stem in the hag of words, whereas nodes 3 and 4 may be multiplied by 1 because the word "from" and "Aus" do correspond to word stems in the bag of words.

In this case, node 3 of the input layer 1302a may be multiplied by weights $w_{31}$ and $w_{32}$, etc., until $w_{3j}$ because it does correspond to a word stem in the hag of words, and node 4 of input layer 1302a is multiplied by weights $w_{41}$ and $w_{42}$, etc., until $w_{4j}$, respectively. In the same manner. With respect to the bag of words algorithm, as discussed above, because the word "from" in node 3 may appear more frequently than the word "Aus" in descriptions 406, titles 402, brands 412, or categories 408 of previous listings 116, the weights of node 3 may be higher than that of node 4, since the bag of words algorithms gauges importance based on multiplicity. By contrast, with respect to the tf-idf algorithm, the weights of node 4 of the input layer 1302a, may be higher than those of node 3, because the inverse document frequency (rarity) of the word "Aus" may be higher across descriptions 406, titles 402, brands 412, or categories 408 than that of the word "from" in node 3.

Subsequently, these nodes in input layer 1302a would be summed to form the output to the hidden layer 1304a (e.g. node 1 in the hidden layer in the example above would be the sum of $w_{11}+w_{21}+w_{31}+w_{41}=w_{41}$ since only node 4 has a word stem in the hag of words). Then the node 1 at the hidden layer 1304a may take this net value and transfer this value further. In the same manner, to the output layer 1306a. At each output layer (hidden layer 1304a with respect to input layer 1302a, and output layer 1306a with respect to hidden layer 1304a) transfer functions comprising the sigmoid activation function $$S(x) = \frac{1}{1 + e^{-x}},$$

hyperbolic tangent function $$tanhx = \frac{e^{2x} - 1}{e^{2x} + 1},$$

or smooth rectified linear unit (SmoothReLU) function $f(x)=\log(1+e^x)$ may be used to transfer outputs.

In the example above, the output given from the input layer 1302a to neuron 1 of the hidden layer 1304a would be inputted as the activation value to be transferred at the hidden layer 1304a to one of the transfer functions described above, and the output would form the value of neuron 1 of the hidden layer 1304a to be given onward as input to the output layer 1306a, and multiplied by respective weights to the neuron 1 of the output layer. In this manner, full forward propagation of input nodes 1 through I in the input layer 1302a may be achieved to the output layer 1306a.

Then, to conduct backpropagation, error is calculated between the expected outputs and the outputs forward propagated from the network. In training the neural network, k-fold cross validation, may be used, particularly when the data sets are small. For k-fold cross-validation, for example, there could be an aggregated set of sentence descriptions all input by the user that are known to be associated with a particular product category with respect to different associated word stems for each group, comprising all the components described above. This set of sentence descriptions may be shuffled and split into a k number of groups (e.g., 5 groups if k is 5, each holding a particular number of results (normalized score measures of importance) and corresponding associated word stems). Then, for each unique group (of the 5 groups in the example above), the group can be held out as a test data set, with the remaining groups of aggregated sentence descriptions and corresponding normalized score measures of importance being used to train the classifier.

To transfer the error, the error signal to propagate backwards through the network is given by error=(expected normalized score−output score)*transfer_derivative(output score), wherein transfer_derivative is the derivative of the transfer function used (sigmoid, hyperbolic, or SmoothReLU).

The error signal for a neuron in the hidden layer 1304a is then calculated as the weighted error of each neuron in the output layer 1306a, according to the weights from the output layer to the neuron in the hidden layer 1304a. Similarly, the error signal from the hidden layer is then propagated back to the input layer 1302a. Once the errors are calculated for each neuron in the network via the back propagation method described, the errors are used to update the weights according to the formula new_weight=old_weight+ learning_rate*error*input. Here, the old weight variable is the previous given weight in the model, the learning_rate variable is a value from 0 to 1 that specifies how much to change the old weight to correct for the error (and consequently how fast the model "learns" or adjusts its weights over time), the error variable is the error calculated by the backpropagation procedure, and the input variable is the value of the input that caused the error.

After or as the text data is being tokenized and scored as described above, categorical data 1204 may also be parsed and encoded. Categorical data in 1204 may be present in the form of brand ID, category ID, shipping fee payer (whether seller 104 is paying), and condition (e.g., fair, used, like new, or new). This information may be calculated in step 608 in the process of FIG. 6. That is, based on the user's input of brand 412 or category 408, an actual brand or category, and their respective ID's may be determined. The ID's may be numerical in nature, wherein an ID of 1 corresponds to brand A or category A, an ID of 2 corresponds to brand B or category B, etc. These ID's, if sent as inputs to regression models used in 1212 as-is, may improperly skew the data. For example, if a Brand C was assigned an ID of 3, a Brand B was assigned an ID of 2, and a Brand A was assigned an ID of 1, if the ID itself was sent as an input to a regression model, the regression model may presuppose that the price value of Brand C may be greater than Brand B, which in turn may be greater than Brand A, because 3>2>1. To avoid such an interpretation by the model, one hot encoding may be used to perform binarization of the category. That is, the information may be arranged in a binary vector as shown below

TABLE 1

| Brand A | Brand B | Brand C |
|---------|---------|---------|
| 1 | 0 | 0 |
| 0 | 1 | 0 |
| 0 | 0 | 1 |

As shown in Table 1, Brands A, B, and C can be represented by a binary vector of 0 and 1 values. As a result because the presence of either brand does not result in a numerical value which is greater than other brands, any potential skewing of the regression model is avoided. Such one hot encoding can be used for both the Brand ED and Category ID, which are sent as inputs to the regression model in block 1212.

Additional categorical data 1204 may also be sent to such a regression model. For example, the shipping fee payer value and the condition may be sent to the regression model. The shipping fee payer value may simply be a Boolean value that is input from the user, which represents whether the seller 104 is responsible for shipping (wherein the Boolean value may be TRUE or 1) or whether the seller 104 is not responsible for shipping costs (wherein the Boolean value may be FALSE or 0).

Lastly, the condition 414 may be input by the user as one of, e.g., four categories. These categories may indicate the condition of an FSO 106, such as "Poor", "Fair", "Good," "Like New", and "New." In an embodiment, "Mint Condition" may used instead of "New." As each of these verbal categories is commensurate with a different value of condition, with Used having the least value and Mint Condition or New having the most value, simple label encoding may be used, wherein each of these labels may be assigned a numerical value (e.g, "Poor" may be 0.1, "Fair" may be 0.2, "Good" may be 0.4, "Like New" may be 0.6, and "Mint Condition" or "New" may be 0.8). Any scale of predefined numbers (e.g., ranging from 0 to 1) may used in this manner to encode the condition labels of the FSO 106. As a result, when this information is passed to the regression model, it can account for a plurality of prospective buyers likely willing to pay more for a product that is in a "Like New" condition as opposed to a "Poor" condition. Alternatively, the condition 414 may be pre-input by the seller 104 in a numerical form, as part of numerical data 1206 described below, such that the label encoding is not needed.

Numerical data 1206 may also be sent to a regression model in block 1212 that may be used. Numerical data 1206 may comprise data that is present as part of the listing information 126 and price history 124 of past listings 116. In the same category 408 as FSO 106 or in all categories 408. Such numerical data may comprise the year, month, and day that previous listings 116 were first offered for sale, as well as the year month and day that such previous listings were actually sold.

From this numerical data two key statistics may be calculated. First, the degree to which the data is recent may be ascertained from the year month and day that a previous listing 116 was sold. The previous listing may be assigned a value between 0 and 1 proportional to the distance between the year month and day that a previous listing 116 was sold, and the current listing of FSO 106 (including after it is listed, as the optimal price 506 may be evaluated after a seller 104 lists FSO 106, as discussed with reference to FIG. 5).

For example, if the previous listing 116 was sold very recently, the distance between the year month and day that a previous listing 116 was sold and the current listing of FSO 106 will be very small, resulting in a value close to 1. On the other hand, if the previous listing 116 was sold a long time back, the distance between the year month and day that a previous listing 116 was sold and the current listing of FSO 106 will be very large, resulting in a value close to 0. To calculate the proportional figure, the earliest previous listing 116 may be used, according to the formula:

$$\frac{\text{date of current listing} - \text{date of previous listing 116}}{\text{date of current listing} - \text{date of earliest previous listing 116}}$$

This formula may be used to give a value corresponding to the degree of recent-ness of the previous listing, which may be sent along with other data of each previous listing 116 to a regression model used in block 1212. Second, from the numerical data in 1206, the age of listing for the previous listing 116 when it was sold can be calculated simply by subtracting the date the previous listing 116 was sold and the date the previous listing 116 was initially offered. In this manner, these two statistics can be sent to a regression model used in block 1212.

Along with the previously described items which may be sent to a regression model in block 1212, further computed parameters, called tabulated parameters 1216, may be gathered by running metrics on the previous listings 116, on the basis of comparison to other previous listings 116 in the same category 408 as the FSO, or in all categories 408. For example, using the numerical data 1206, the scarcity of a particular item sold in previous listing 116 (e.g., corresponding to a particular category 408) may be determined. If there were not many items present in the time period which the previous listing 116 was sold (within a predetermined number of days, e.g. 7 days), then the scarcity value of the previous listing may be proportionately higher. Conversely, if there were many items present in the time period which the previous listing 116 was sold (within a predetermined number of days, e.g. 7 days), then the scarcity value of the previous listing may be proportionately lower. The basis of comparison may be the least scarce item of all previous listings 116, e.g. in an embodiment according to the formula:

$$1 - \frac{\text{amount of items present in same category 408 within predetermined days, for previous listing 116}}{\text{amount of items present in same category 408 within predetermined days, for least scarce listing 116}}$$

Furthermore, the parameter of a number of views of previous listing 116 may also be recorded by summing, e.g., listing information 126 including times that the listing 116 may have been accessed by prospective buyers 108.

Regression models used in block 1212 with the previously sent inputs will now be discussed. Each of these regression models may output a predicted price. Based on such a predicted price, analysis of a price range may occur as it did in the first overarching paradigm and the second overarching paradigm. Here as well, an inter-quartile range of values may be calculated using previous listings 116 in the same category 152 of the product, or using all products. In an embodiment, this calculated interquartile range may be shifted so that the predicted price from the regression models may lie at the center of the range, wherein the range serves as a measure of variability as described above. Alternately, the price range may be calculated by a neural network model itself as will be described.

Figure 13B:
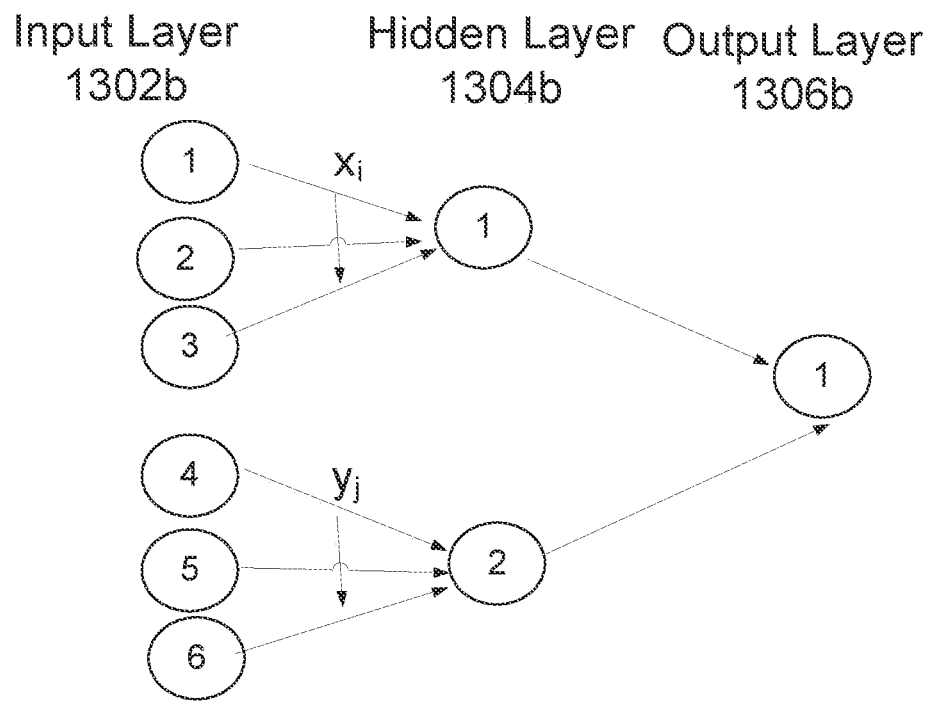
FIG. 13B shows an example of a neural network model that may be used for predicting price, as well as a price range confidence interval, according to some embodiments.

Firstly a neural network regression model may be discussed. The model is as shown in FIG. 13B, with input layer 1302b, hidden layer 1304b, and output layer 1306b. The model operates principally in the same manner as disclosed above with respect to FIG. 13A, and may use the same transfer functions, etc. In an embodiment, the rule of thumb discussed with regard to FIG. 13A for calculating the number of nodes in the hidden layer 1304b may also be used.

However, alternately. In another embodiment (the one which will be discussed herein), two nodes may be used for the hidden layer. As shown, there may be a single weight $x_i$ for each of a predetermined number of nodes 1 to i (e.g., 1-3 as shown in FIG. 13B) to Node 1 of the hidden layer 1304b. Similarly there may be a single weight $y_j$ for each of a predetermined number of nodes i+1 to j (e.g., 4-6 as shown in FIG. 13B) to Node 2 of the hidden layer 1304b. Finally, both of the hidden layer nodes in 1304b may combine, with weights p and q, respectively, at the output layer 1306b, to generate an output score at Output Layer 1306b.

The first node of the hidden layer 1304b, Node 1, represents price drivers, or ordinary factors which may influence the price of a listing. The second node of the hidden layer 1304b, Node 2, represents multiplying factors which may have an exponential influence on the price of a listing. The weights p and q of the hidden layer nodes, may reflect this arrangement by being weighted such that weight p of Node 1 of hidden layer 1304b to output layer 1306b may be less than the weight q of Node 2 of hidden layer 1304b to output layer 1306b. When parameters are first assessed, the neural network model 1300b may be category ID dependent. That is, there may be a separate neural network model for each different category 152 of product. This embodiment is described herein. Alternately, if the product of items has pricing which more largely reflects general trends for all products, then an embodiment may be used wherein all product listings 116 in all categories 152 are considered.

Having a separate neural network model for each different category 152 of products may be particularly useful when there are trends present in the pricing of some categories of products, that are associated with features that are used in the machine learning model, that are not present in other categories.

For still other categories of products, such as luxury items, extra steps need to be taken to make sure the proper data of previous listings 116 is being analyzed. For example, the previous listings 116 in a category 152 may be associated with luxury goods, determined through the category ID as part of the categorical data 1204 described earlier. In this case, all previous listings 116 may be authenticated. If a certain number of previous listings 116 may be found to be fake and not authentic, then these listings can be excluded from the training of the regression model.

Within the category 152 specific neural network regression model, the nodes are now described. Input nodes 1 to i may include at least one of measures such as scarcity, number of views, scores for description 406, title 402, brand 412, and category 408 after tokenization, which may be generated by another neural network model as described above. The measures above in input nodes 1 to i may also include the condition 414 of the product, converted through label encoding as described above, the SKU of the product, the seasonality or perishability (as a value of −1 or 1, e.g., 1 if not perishable/seasonable and −1 if perishable seasonable), the slider input from slider 1018 of GUI 1000 (as a value of −1 if positioned at the end of maximize time, 1.5 if positioned at the end of maximize profit, and 0 at the center), and the presence of a sell-by condition from fields 1014 and 1016 of GUI 1000 (wherein if there is a sell-by condition, then the input node value may be a negative value commensurate to the number of days, wherein a shorter number of days results in a greater negative value). As discussed above, when a charity option is selected, the field 1016 may automatically be filled out and the field 1014 may be checked, meaning that the presence of a sell-by condition in the neural network model may also take the selection of the charity option into account.

The values of the measures for input nodes present in 1 to i concerning seasonality or perishability, the slider input from slide 1018 of GUI 1000, and the presence of a sell-by condition are herein explained. As explained above, nodes 1 to i affect ordinary pricing conditions, that is, the demand of the product. When a product is deemed to be perishable, this has a negative of effect on pricing or demand on the product. In that the seller 104 may want to sell such a product before it perishes or goes out-of-season, as explained above.

As a result, if such a condition is present, to adjust the overall demand lower (and hence the overall price result lower) a negative value is input at the input node. With a lower overall output from nodes 1 to i in the input layer 1302b to the hidden layer 1304b, the eventual output value of Node 1 of 1304b to the output layer 1306b is consequently lowered. This in effect lowers the initial offer price, which is needed to ensure the sale of a product before it perishes or goes out-of-season. The value is not restricted to −1 in the case of a perishability/seasonality being present, and can be adjusted as needed to effect a greater/lesser decrease in price.

Similarly the slider input from the slider 1018 of GUI 1000 is present as a node ranging from −1 to greater than 1. In the case of maximization of profit, the seller 104 has in effect indicated that they are willing to wait even longer than normal for the product to be sold. In such a case, the demand may be increased or boosted, to a certain degree, by making the node value greater than 1, which as explained above has an effect on the price outputted by Node 1 of the Output Layer 1306b which serves to increase the price. In the case of maximization of time (the other end of the slider 1018 as shown in GUI 1000), the value may be −1 for the same reason as with the perishability/seasonality node as explained above. In order to sell the product at a faster rate than normal, the demand may be artificially lowered by a negative value, resulting in a slightly lower optimal price value at Node 1 of 1306b than normal, which would encourage buyers to buy such a product at a faster rate.

An alternate embodiment may be present in the case of a sell-by condition given a particular number of days from the field 1016 of GUI 1000. As discussed above, for each previous listing 116, there is a metric calculated indicating the number of days from when the listing was offered until when it was sold. In this case, a bagging or bootstrapping approach may be followed on the basis of such a metric. That is, previous listings that have a value for this metric that is greater than the number of days from field 1016 of GUI 1000 may be excluded from the training of the neural network model in FIG. 13B, and in conducting backpropagation for the adjustment of weights $x_i$, $y_j$, p, and q.

By doing so, previous listings 116 that were sold after the number of days which the user is planning to sell by are excluded from training the model. In this way the model can capture the trends associated with such a subset of previous listings 116 (e.g., lower demand and lower prices in order to sell faster). In this embodiment, a window of days may also be used.

For example, a seller 104 may indicate in field 1016 that they want to sell-by 0 days, which means they would want to sell immediately. In this case, a bootstrapping approach where a window of 5 days is used may allow for all previous listings 116 that were sold proximate to the immediate initial offering day can be considered. Instead of only listings 116 from day 0. The use of such a window can allow for the consideration of a greater amount of data where there are few data points or previous listings 116 available.

In this manner, as described above, the artificial neural network of FIG. 13B allows for deep learning of multiple layers and multiple neurons (nodes) to "learn" about the interactive effects of these variables on listing prices. As discussed above with respect to the neuron network model in FIG. 13A, the weights of the nodes at each layer can be adjusted by the comparison of the price output by node 1 of the output layer 1306b with designated actual optimal price values for the previous listings 116 in the subset that is used to train the model. In this manner, weights may be adjusted in each training iteration via back-propagation to reduce errors.

The nodes i+1 to j of the input layer 1302b (e.g., nodes 4 to 6 in input layer 1302b of FIG. 13B) will herein be described. As explained above, these input nodes have an effect which may be exponential on price, and as such output to Node 2 of the Hidden Layer 1304b, which accounts for scaling factors. Firstly a measure of picture-worthiness might be used as one of these nodes i+1 to j. Picture worthiness may be the result of an output of the use of a neural network, such as that shown in FIG. 13A. Each picture that is used for a listing 112 may have input data which is used at input nodes of an input layer 1302a.

For example, there may be a node 1 which denotes if the brightness level of the picture exceeds a certain threshold (which may be a Boolean value of 1 or 0, 1 if yes 0 if no). Similarly there may be a node 2 which denotes if a certain amount of threshold distance is present from the camera to the object (which may be a Boolean value as with brightness above).

There may also be a node 3 denoting if the effect of a shadow is pronounced (which may be a Boolean value of 1 or 0, 0 if yes 1 if no). Any number of additional inputs at the input layer 1302a may be present, and such a neural network may follow the rules of thumb discussed above with regard to FIG. 13A. The output of such a neural network of the type shown in FIG. 13A may be a single node 1 at the output layer 1306, which depicts a score of the value of the picture. If the score is higher, then that means the picture may be more valuable in attracting attention to the listing 112, and ultimately boosting price.

As described, each picture that is used for a listing 112 (both for previous listings 116, used as training data, and the current listing 112 for the FSO 106, which would be used as test data) may thus have input data values at nodes 1 to i of input layer 1302a that are used for determining a picture worthiness score. In an embodiment, the picture with the maximum score may be automatically displayed on the GUI 1000 as the default listing picture 1002. Next, the scores for all of the pictures may be averaged, and normalized, on a scale of 1-10 indicating picture worthiness. Any other scale may also be used (such as 0 to 1, etc.). This normalized picture worthiness statistic may then be used at an input node of input nodes i+1 to j (corresponding to nodes 4-6 in FIG. 13B).

Similar to photo-worthiness, the output of another neural network similar to FIG. 13A may be used for determining social favorability or the trending nature value of the FSO 106. Social favorability may be used as an input node in one of nodes 1 to i which has an effect on ordinary pricing, whereas the trending nature value may be used as a scaling factor in one of input nodes i+1 to j.

For both of these measures, separate models which resemble the neural network of FIG. 13A may be used. First, with respect to both models (for social favorability and trending nature value), a bag of words may first be created. Such a bag of words may be created by taking original textual string data of the listing 112 of the FSO 106 and previous listings 116 of the same category. Including the description 406, category 408, brand 412, and title 402, and finding relating posts that are deemed to be favorable matching this text from social media content services such as FACEBOOK, TWITTER, SINA WEIBO, AMEBA. INSTAGRAM, etc. From these related posts, a bag of words comprising most commonly found word stems, as described above with respect to FIG. 13A, can be created. Then, using the bag of words approach, or the tf-idf approach, as discussed above with respect to block 1208 of FIG. 12, the model may be trained to output a score of social favorability at a single output node 1 in an output layer 1306a of such a model.

For the trending nature value, the social favorability model may be used with a bagging approach. For example, the social favorability model may be trained using previous listings with a sold date (from numerical data 1206 as discussed above) that is within a window of a predetermined number of years only, and this window may be moved over time (e.g. training of the social favorability model using previous listings from 116 in a window for 3 years, from 2000-2003, 2003-2006, 2006-2009, 2009-2012, etc.), with a new neural network model used for each different window.

To have a greater capture on recent trends, a smaller window may be used (e.g., 1 month), but corresponds as well to an increase in processing time, so a balance optimal for the seller 104 may be determined and used. Then, the input test data from the listing 112 corresponding to FSO 106 may be used with respect to each created model for each respective different window, and may output a social favorability score. Because the textual data of the FSO 106 is the same input data that is applied to each model, if there is a jump in social favorability scores between models, this is considered to be a jump in the rate of change over time of the social favorability of the products in the product category 152, and the use of language associated with the bag of words may therefore attract an exponentially greater (or lesser if it is trending negatively due to a manufacturer defect, etc.) demand, and boost price. In an embodiment, such a plurality of social favorability models may be created in one month windows, for example, leading up to the current listing time of the FSO 106 (or age of listing if it has already been listed), wherein the most recent average rate of change (e.g., over the last 3 months) of the social favorability score, may normalized on a scale of −1 to 1 (or any other numerical scale) and be used as the trending nature value in an input node of input nodes i+1 to j in FIG. 13B.

Finally, another node that is considered to be a scaling factor is the degree to which the training data of previous listings 116 is recent. In training the model of FIG. 13B, recent data may be emphasized as more valuable in an embodiment, because recent data may have more of a bearing on the optimal offer price in current times, as compared to historic data, due to differences in the buying and selling climate. To create this greater emphasis, the metric of the degree of recent-ness may be used as an input node of input nodes i+1 to j in FIG. 13B, as a scaling factor. Alternately, all of input nodes 1 to j may be multiplied by the metric of the degree of recent-ness, such that previous listings that are more recent may have more of an impact on the optimal price that is output by Node 1 of the Output Layer 1306b.

In this manner, the neural network of FIG. 13B may be trained by the training data comprising previous listings 116 of the same category 152 as the FSO 106 (or of all categories 152 in the alternate embodiment described above), and then backpropagated to adjust the weights $x_i$, $y_j$, p, and q, accordingly. Then the trained model can be used with the input values for nodes 1 to j associated with the listing 112 of the FSO 106. Ultimately, an optimal price is output by Node 1 of 1306a when used with these test input values.

This calculated optimal price is then output back to the GUI 1000 in field 1004, as shown in FIG. 10. The price range of such a price may be calculated using the approach of the first or second paradigm as described above, or may be calculated using the neural network model of FIG. 13B. To calculate the price range using the neural network model of FIG. 13B, a leaving-out technique is used. In the leaving-out technique, a randomly chosen fraction of the connections of the neural network model are turned off, or pruned, from the model.

An example is shown with reference to FIG. 13A, wherein for a drop-out of 0.25, assuming there are 8 connections from the input layer 1302a nodes to the nodes of the hidden layer 1304a, 2 of these (in bold) may be randomly pruned. Similarly, 2 connections from nodes from the hidden layer 1304a to the output layer 1306a (in bold) may also be pruned. By repeating this process for a predetermined number of iterations, training each of these "left-out" neural network models, and observing the output scores from the output layer 1306b of each of these models, a price range can be constructed.

For example, if 100 such models are made with dropout as 0.25, then 100 different predictions may be made using the input values associated with the listing 112 for FSO 106. Using these different predictions of output score, if 50 of these fall within a certain range, then this may be a 50% price range that will be used. Again, this is a measure of variability, and may be shifted such that the predicted optimal price is at the center of such a price range. The percentage of dropout used may be compared to known price ranges present with regard to previous listings 116, such that it may provide a suitable prediction for price range.

Thus, the optimal price and the price range (with the optimal price at the center of the price range. In an embodiment) may be output to the GUI 1000. The price range (which covers the middle 50% of score values) may be highlighted in a color and displayed along a horizontal axis 1010, where values below and above this range may be highlighted in different respective colors. A slider may be set at the center of this horizontal axis as shown in FIG. 10 corresponding to the optimal price, and an accompanying message may be shown through a message bubble 1006 indicating that the range is suitable for FSO 106 to be sold while maximizing both profit and minimizing time for the product to sell.

A view curve 1008, which may be calculated based on historic data of number of views from block 1216 as discussed above for previous listings 116 in the same category, may be superimposed upon the price range of axis 1010, with a displayed vertical dashed line from the maximum number of views. In this manner, the user may know at which price within the price range they can likely achieve the most views from, while at the same time maximizing profit and minimizing the time needed to sell the item.

Similar products within the category 152 for FSO 106 that have a sold price within the calculated price range for FSO 106, may be displayed in field 1012 as shown. Finally, an auto-adjust checkbox 1020 may be shown with respect to field 1020 on GUI 1000. The presence of the checkbox, when checked can provide an intuitive way for the user to maximize profit, or minimize the time-to-sale ("Maximize Time"), as shown on slider 1018. That is when a user drags the slider to the Maximize Profit end of the slider 1018, the slider of axis 1010 may be automatically adjusted to go to the right end of the optimal price range (middle 50%, although it can be any other predetermined range in other embodiments), at $400 as shown in FIG. 10. Conversely, when a user drags the slider to the Maximize Time end of slider 1018, the slider of axis 1010 may be automatically adjusted to the left end of the optimal price range of axis 1010, at $300 as shown in FIG. 10.

Figure 12:
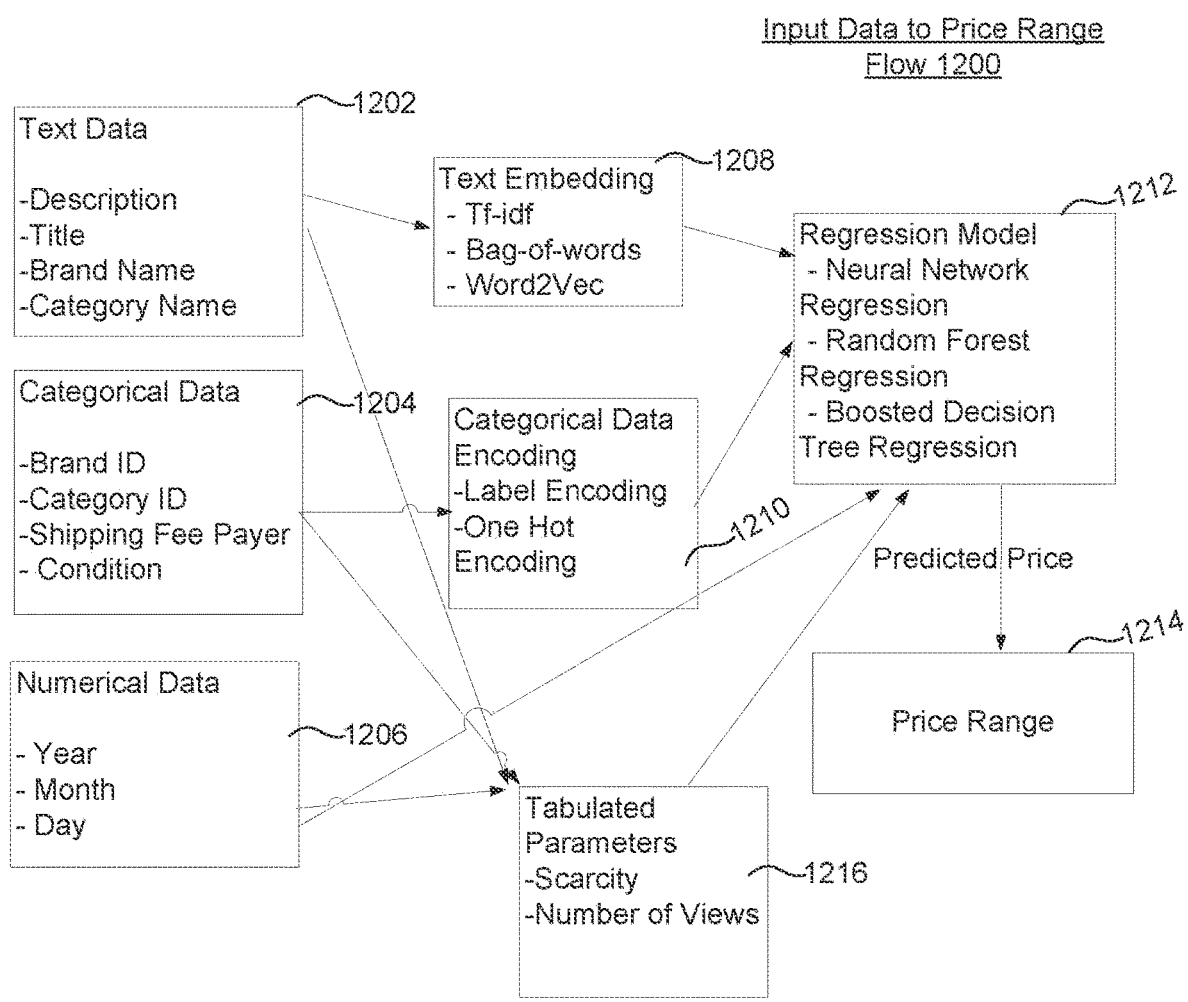
FIG. 12 shows a flow diagram depicting the translation of input data from the user to data that is used in a regression model to output a predicted price and price range, according to some embodiments.
Figure 14:
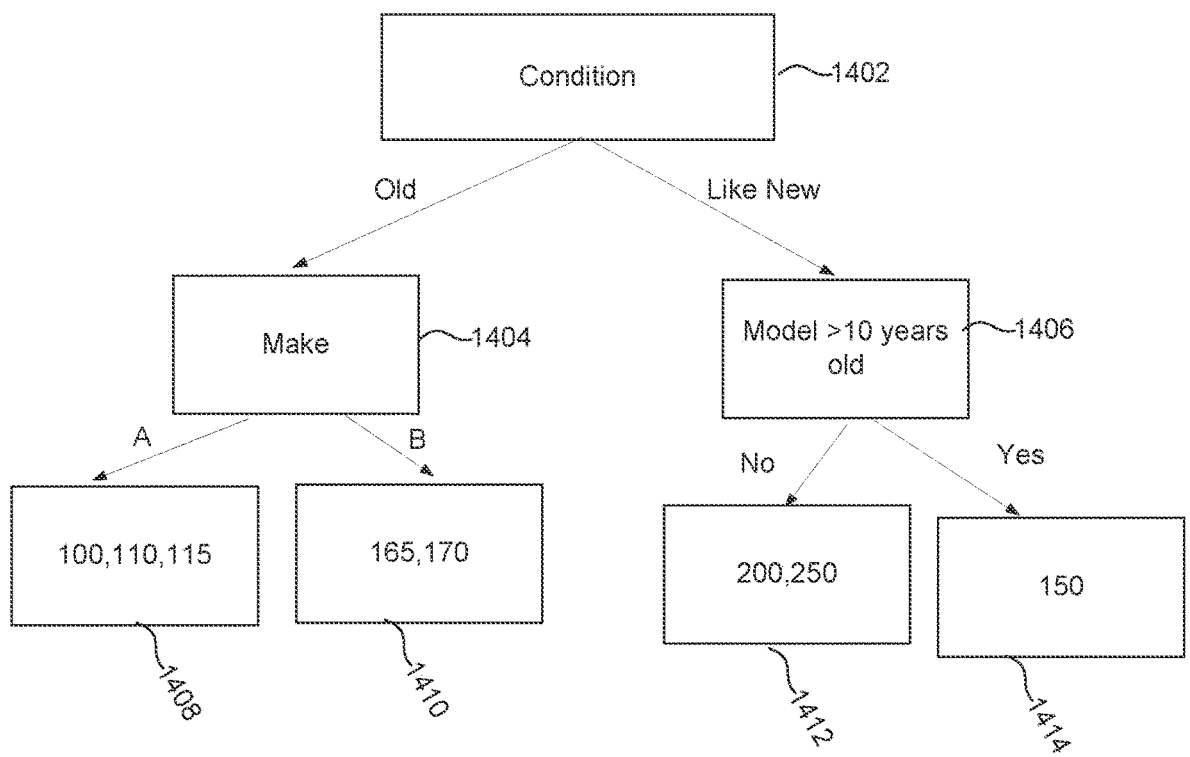
FIG. 14 shows an example of a decision tree that may be used in a random forest regression or boosted tree regression model, according to some embodiments.

As shown in block 1212 of FIG. 12, a random forest regression model or a boosted decision tree regression model may also be used in place of the neural network regression model. Such models will be described with reference to FIG. 14. These models are based on conditional evaluations. First, for training data comprising past listings 116. Input data is evaluated at a decision split 1402. In the tree 1400 shown the split is based on the condition 1402 of a listing 112.

Thus if a product is in Like New condition, it may proceed down the right path of the tree, and if the product is in an Old condition, it may proceed down the left path of the tree. If the product is Old, it's Make 1404 may be examined, where if the product is of a Make B, then the training score falls in box 1410. At the end of the training process the boxes 1408, 1410, 1412, and 1414 are averaged, such that only one output value remains at the end of each path. Then when the test input data is used with the decision tree 1400, the output value is the optimal price 506. In decision trees, the best performing features from nodes 1 to j in the neural network regression model may be taken as split nodes (the features that minimize variance), and this results in one tree for a category 142.

However. In random forest regression, these features are selected randomly, and multiple trees are created. The features which comprise nodes 1 to j in the neural network model may be taken into consideration, and a randomized threshold of features (e.g., 5 features) is used to create the Decision tree. A plurality of such trees may be created, and their scores may be averaged and output as the optimal score 506. If the first or second paradigm is used, as described above the seller 104 may inform the pricing module 138 (via the specifications 154) that the seller 104 wishes to sell within a predetermined number (e.g., 20 days) of the age of the listing. Assume the example category decay curve 202 shown in FIG. 2 applies to the category 152 of the FSO 106 being offered. In the example of FIG. 2, decay point 208B of 80% is closest to listing age 210=20 days. Thus, the pricing module 138 may apply this decay point 208B—that is 80%—to thereby suggest an offer price 404 of $8 (that is, 0.8×$10). The seller flexibility curve 304 associated with the seller 104 can also or alternatively be applied in the same way to generate the offer price 404.

Similar to the first and second paradigm, the third paradigm after generation of the price range, may also have an associated confidence threshold (denoted as ct_c) for the optimal price and price range. Such a confidence threshold may depend on the number of past listings 116 that are used to train the neural network regression model, as well as the number of past listings 116 that are used in generation of the price range.

Depending on the confidence threshold, a decision to use the first, second, or third paradigm may be made. For example, a threshold value for decision making may be set (e.g., 0.6). If the third paradigm has a greater confidence threshold statistic (e.g., ct_c is 0.8) than the decision threshold, and ctb, et a are under the decision threshold, then the third paradigm may be used. If multiple paradigms have confidence threshold values above the decision threshold, then the paradigm with the highest confidence threshold measure may be used. Finally, if none of the paradigms have confidence threshold values above the decision threshold, then a weighted average of all three optimal prices and price ranges generated by the three paradigms may be used. For example, the optimal price may be calculated per the formula:

$$\frac{ct_a * \text{optimal price } a + ct_b * \text{optimal price } b + ct_c * \text{optimal price } c}{ct_a + ct_b + ct_c}$$

The lower and upper bounds of the price range for the first through third paradigms may be weighted in a similar manner, with lower bound a-c and upper bound a-c replacing the optimal price a-c values in the formula above. In these formulas, 'a' corresponds to the first paradigm, 'b' corresponds to the second paradigm, and 'c' corresponds to the third paradigm.

Other embodiments for generating offer prices for FSOs 106 are described in U.S. patent application titled "Inventory Ingestion And Pricing System," Ser. No. 16/288,203, filed Feb. 28, 2019, which is herein incorporated by reference in its entirety, and any of those embodiments may be used herein.

Referring again to FIG. 6. In 612, the listing module 134 generates one or more listings 112 for the FSO 106 being offered. The different listings 112 may have varying titles, descriptions, pictures and offer prices 404. As discussed above, the offer prices 404 in the listings 112 may be the seller's original price 504 provided in 604, the optimal price 506 generated by the pricing module 138 in 610, and prices in between based on, for example, ZOPAs 508 associated with the seller 104 and/or the category 152 of the FSO 106 being offered that was determined in 608.

For example, with reference to the above example discussed for ZOPA 508B, multiple listings may be generated covering offer prices P2-P5 simultaneously. In an effort to expedite buyer agreement. In another example, as discussed with respect to the artificial intelligence aspects above, some pictures may be deemed to be more valuable than others per the neural network analysis. In this case, pictures which do not cross a particular threshold of value may be excluded from additional generated listings.

For example, if the original output picture worthiness value for a picture is less than an acceptance threshold, it may be excluded from an additionally generated listing. In addition, the social media neural network may be used to assess similar data points in the same product category 152, to determine if any particular description language may be associated with an application trending. For example, listing information 126 may be searched for descriptions or title language presented as inputs which correspond to a high social media output value from the social media demand neural network. For example, if the words "noveau leather" or "new" or "mint condition" may be associated with highly trending handbags in the social media neural network, then these words may also be used (if not used already in the original description 406 of a listing 112) in additional generated listings 112 If there are various words that are associated with highly trending products within a category, a plurality of listings 112 may be generated, one corresponding to each of these word inputs.

Figure 8:
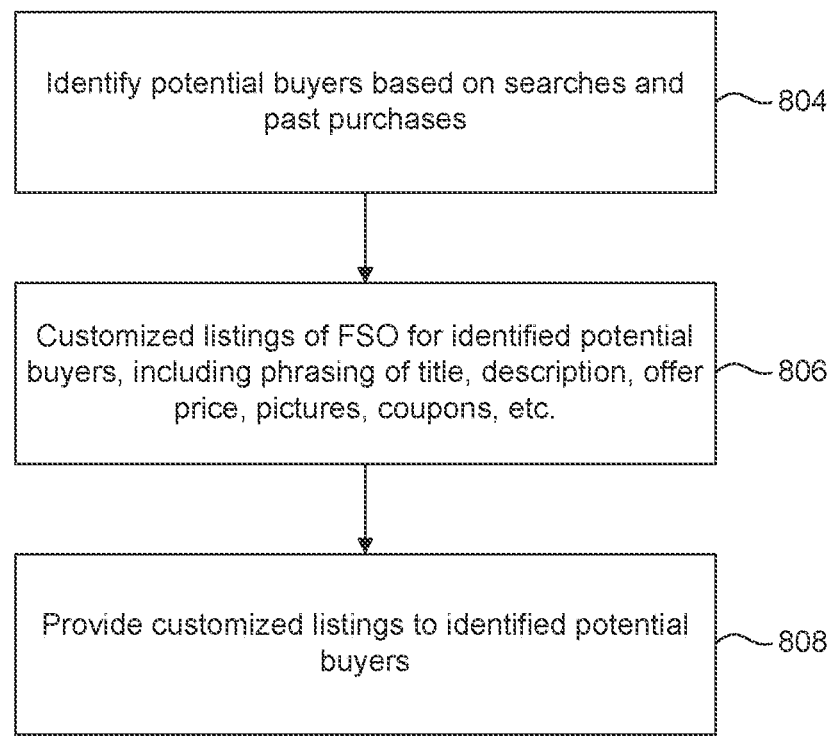

A further example of such operation of generating additional listings is shown in a flowchart 802 of FIG. 8. In 804, the listing module 134 identifies potential buyers 108 of the FSO 106 being offered. For example, if the FSO 106 is a particular designer dress, a potential buyer 108 could be someone who has searched for or purchased dresses by that designer. As another example, if the FSO 106 is an IPHONE accessory, a potential buyer 108 could be someone who has recently purchased an IPHONE, or who has recently searched for IPHONE accessories.

In 806, the listing module 134 generates at least some of the listings 112 for the FSO 106 being offered, so as to customize them for the potential buyers 108 identified in 804. The listing module 134 may implement this by searching for past listings 116 of FSOs 106 purchased by the potential buyers 108. Then, the listing module 134 may use the neural network model described, which may be trained on this subset of past listings 116, and associated transaction information 118. In this way, the neural network can analyze the past listings 116 to identify tendencies and preferences of the potential buyers 108 with regards to the features of the neural network model. Certain descriptions, phrases, picture types, or other listing information 126 may be associated with higher demand from the potential buyers 108, and consequently may result in more profitability for the seller. For example, some buyers 108 may be more likely to purchase if the offer price 404 is within a certain range, or if the listing 112 includes pictures where scale is indicated, or if the listing 112 is less busy (for example, contains a shorter description).

In 808. In addition to posting the listings 112 on the site 110, the listing module 134 may bring the customized listings 112 to the attention of the respective potential buyers 108 (via email or text, or posting on the buyer 108's home page on the site 110).

Other embodiments for automatically generating listings 112 are described in U.S. patent application titled "Inventory Ingestion And Pricing System," Ser. No. 16/288,203, filed Feb. 28, 2019, and U.S. Provisional Application No. 62/900,764 titled "Automating The Creation Of Listings Using Augmented Reality Computer Technology," filed Sep. 16, 2019, which are herein incorporated by reference in their entireties, and any of those embodiments may be used herein.

Referring again to FIG. 6. In 614, after the listings 112 have been posted on the site 110 (and prior to the sale of the FSO 106 being offered), the smart nudge engine 140 periodically uses the ZOPA 508 associated with the current listing age 210 to suggest lower offer prices 404 to the seller 104, so as to "nudge" the offer prices 404 into the applicable ZOPA 508 (to the extent the offer prices 404 are not already in the ZOPA 508).

As also discussed above. In determining the ZOPA at different ages of listing after the seller 104 has initially offered the FSO 106 for sale, the optimal price 506 may be periodically re-evaluated. When the optimal price 506 is re-evaluated at a later time, the inputs 1 to j of the neural network may be re-entered into the neural network regression model described above to determine optimal price. In this manner, the model may be able to capture altered demand due to market conditions.

For example, if a new product is out, the product perishes or is out of season, or the seller has now undergone financial difficulties and has dragged the slider 1018 in GUI 1000 to indicate that the seller would like to sell the product soon, each of these inputs can be accounted for in the model and adjust the model to suggest a new optimal price 506. Furthermore, the emergence of a social media trend that may not have been present when the FSO 106 was initially offered for sale may also be captured by the re-evaluation of the optimal price 506 by the smart nudge engine 140.

In an additional embodiment, if a sell-by condition exists, bagging or a bootstrap approach may be performed as described above with respect to the neural network model of FIG. 13B, wherein all previous listings that have a sold date that exceeds the value (in days) of the field 1016 in GUI 1000 in FIG. 10 may be excluded from training the model. In the case where the optimal price is re-evaluated, the neural network model. In a further embodiment, may also take a bagging/bootstrap approach where all previous listings 116 that have a sold date before the current listing time may also be excluded. For example, the listing time with respect to ZOPA 508B is 15 days. If the sell-by condition of 1016 in FIG. 10 is 56 days, per this approach, when the optimal price is re-evaluated by the neural network model of FIG. 13B at 15 days, all previous listings 116 that were sold prior to 15 days or after 56 days from their initial date of offering may be excluded from training the model. The model may then be retrained by previous listings that were sold between 15 days and 56 days from their initial date of offering, and then test data associated with the listing (including any updated fields in GUI 1000 of FIG. 10) may be inputted as test data for nodes 1 to j of the model, and the updated optimal price 506 may be output.

By taking this updated bootstrap/bagging approach, it may be possible to capture trends that are specific to the age of listing 210. In a still further embodiment, bagging/bootstrapping may be conducted between 0 days and the sell-by condition e.g., 56 days in field 1016) in one model, between 15 days and 56 days in another model, and the output of both models may be averaged.

Figure 9:
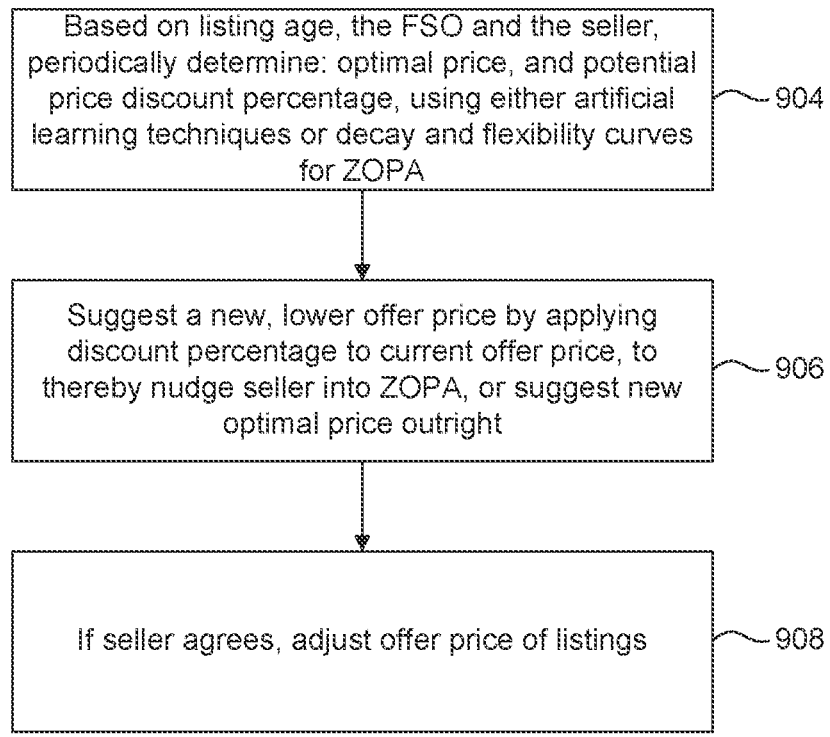

An example of such operation is shown in a flowchart 902 of FIG. 9. In 904, the smart nudge engine 140 accesses the ZOPA 508 applicable to the current listing age 210.

In 906, the smart nudge engine 140 determines new offer prices 404 for those listings 112 where the current offer price 404 is outside the applicable ZOPA 508. The new offer prices 404 may vary among these listings 112.

Also, in some embodiments, the smart nudge engine 140 may generate more aggressive offer prices 404 (that is, closer to the optimal price 506) if the seller 104 indicated the FSO 106 was being sold for charity, so as to sell the FSO 106 in a shorter period of time. Similarly, the pricing module 138 may generate a more aggressive (that is, lower) optimal price 506 in 610 (as an initial offer price 404) when the seller 104 has indicated the sale is for charity. The same is true where the seller 104 has indicated through the specifications 154 that the seller 104 wishes to sell the FSO 106 within a relatively short period of time.

Also in 906, the smart nudge engine 140 suggests these new offer prices 404 to the seller 104, where the new offer prices 404 are within the range of the applicable ZOPA 508 for the current listing age 210. If the seller 104 agrees, then in 908, the smart nudge engine 140 changes the offer price 404 in the listings 112. In other embodiments, if so instructed by the seller 104 (in 604), the smart nudge engine 140 will automatically adjust the offer prices 404 as discussed above without seeking approval of the seller 104.

Referring again to FIG. 6, Step 614 is repeated until the FSO 106 being offered sells.

In 616, after the FSO 106 being offered sells, the payment from the buyer 108 is processed (and provided to designated charities, if the seller 104 elected the charity option in 606). All of the listings 112 associated with the FSO 106 that were generated in 612 are locked or deleted to prevent further purchase by other buyers 108.

Example Computer System

Various embodiments and/or components therein can be implemented, for example, using one or more computer systems, such as computer system 1500 shown in FIG. 10. Computer system 1500 can be any computer or computing device capable of performing the functions described herein. For example, one or more computer systems 1500 or portions thereof can be used to implement any embodiments of FIGS. 1-14, and/or any combination or sub-combination thereof.

Computer system 1500 includes one or more processors (also called central processing units, or CPUs), such as a processor 1504. Processor 1504 is connected to a communication infrastructure or bus 1506.

One or more processors 1504 can each be a graphics processing unit (GPU). In some embodiments, a GPU is a processor that is a specialized electronic circuit designed to process mathematically intensive applications. The CiPU can have a parallel structure that is efficient for parallel processing of large blocks of data, such as mathematically intensive data common to computer graphics applications, images, videos, etc.

Computer system 1500 also includes user input/output device(s) 1503, such as monitors, keyboards, pointing devices, etc., that communicate with communication infrastructure 1506 through user input/output interface(s) 1502.

Computer system 1000 also includes a main or primary memory 1008, such as random access memory (RAM). Main memory 1508 can include one or more levels of cache. Main memory 1508 has stored therein control logic (i.e., computer software) and/or data.

Computer system 1500 can also include one or more secondary storage devices or memory 1510, Secondary memory 1510 can include, for example, a hard disk drive 1512 and/or a removable storage device or drive 1514. Removable storage drive 1514 can be a floppy disk drive, a magnetic tape drive, a compact disk drive, an optical storage device, tape backup device, and/or any other storage device/drive.

Removable storage drive 1514 can interact with a removable storage unit 1518. Removable storage unit 1518 includes a computer usable or readable storage device having stored thereon computer software (control logic) and/or data. Removable storage unit 1518 can be a floppy disk, magnetic tape, compact disk, DVD, optical storage disk, and/any other computer data storage device. Removable storage drive 1514 reads from and/or writes to removable storage unit 1518 in a well-known manner.

According to an exemplary embodiment, secondary memory 1510 can include other means. Instrumentalities or other approaches for allowing computer programs and/or other instructions and/or data to be accessed by computer system 1500. Such means, instrumentalities or other approaches can include, for example, a removable storage unit 1522 and an interface 1520. Examples of the removable storage unit 1522 and the interface 1520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1500 can further include a communication or network interface 1524. Communication interface 1524 enables computer system 1500 to communicate and interact with any combination of remote devices, remote networks, remote entities, etc. (individually and collectively referenced by reference number 1528). For example, communication interface 1524 can allow computer system 1500 to communicate with remote devices 1528 over communications path 1526, which can be wired and/or wireless, and which can include any combination of LANs, WANs, the Internet, etc. Control logic and/or data can be transmitted to and from computer system 1500 via communication path 1526.

In some embodiments, a non-transitory, tangible apparatus or article of manufacture comprising a tangible computer useable or readable medium having control logic (software) stored thereon is also referred to herein as a computer program product or program storage device. This includes, but is not limited to, computer system 1500, main memory 1508, secondary memory 1510, and removable storage units 1518 and 1522, as well as tangible articles of manufacture embodying any combination of the foregoing. Such control logic, when executed by one or more data processing devices (such as computer system 1500), causes such data processing devices to operate as described herein.

Figure 15:
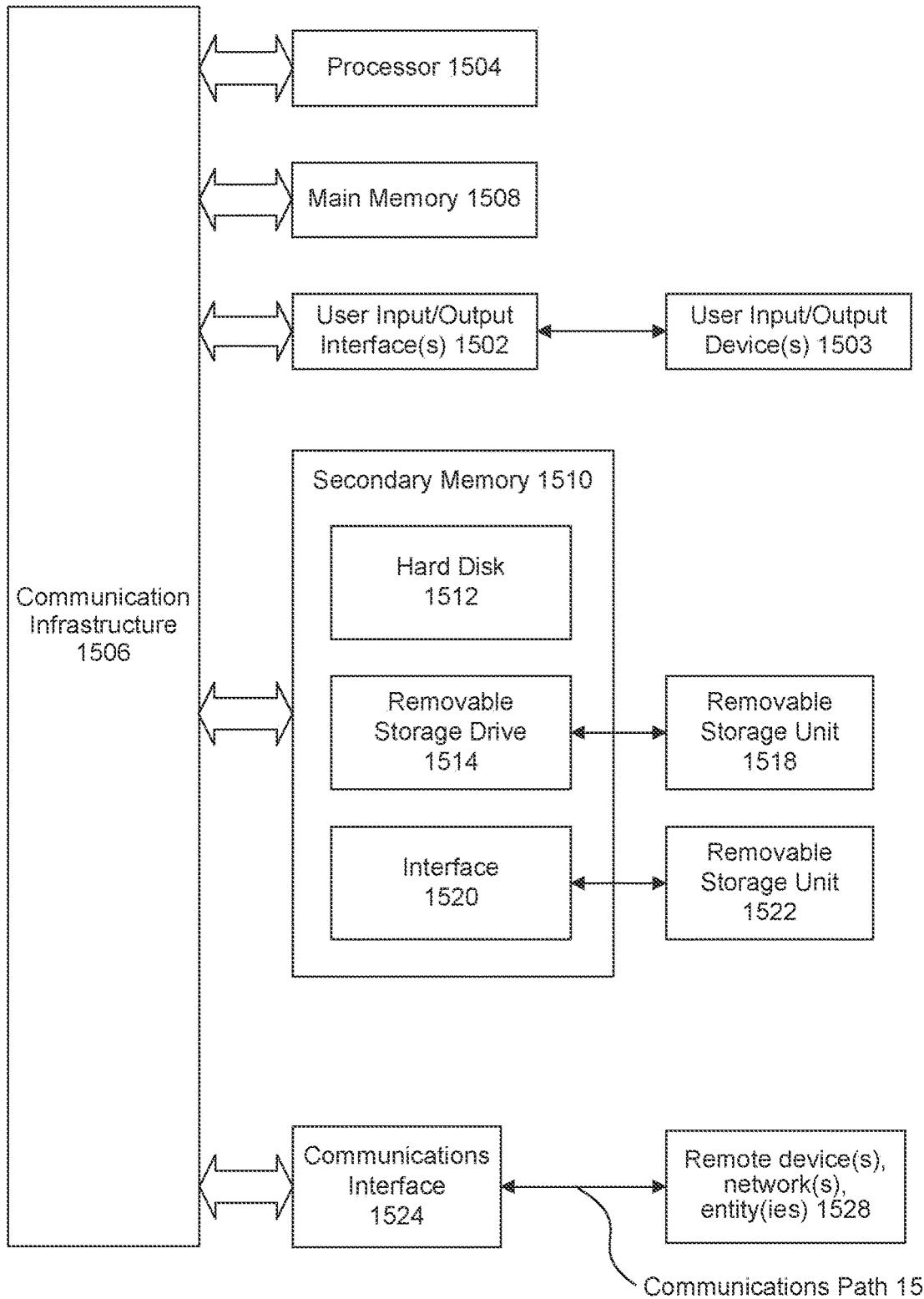
FIG. 15 illustrates an example computer system useful for implementing various embodiments.

Based on the teachings contained in this disclosure, it will be apparent to persons skilled in the relevant art(s) how to make and use embodiments of this disclosure using data processing devices, computer systems and/or computer architectures other than that shown in FIG. 15. In particular, embodiments can operate with software, hardware, and/or operating system implementations other than those described herein.

CONCLUSION

While this disclosure describes exemplary embodiments for exemplary fields and applications, it should be understood that the disclosure is not limited thereto, Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled." however, can also mean that two or more elements are not in direct contact with each other, but yet still co-operate or interact with each other.

What is claimed is:

1. A method, comprising:
   determining a numerical identifier corresponding to a category of a for sale object (FSO);
   performing a binarization of the numerical identifier using hot encoding, wherein the binarization of the numerical identifier generates a unique binary vector representing the category;
   using a neural network regression model, operating across one or more computing devices, to generate an optimal offer price based on at least the category of the FSO;
   providing information including textual input about the FSO to the neural network regression model, wherein the neural network regression model is configured to tokenize the textual input;
   providing the unique binary vector representing the category instead of the numerical identifier to the neural network regression model;
   outputting the optimal offer price, generated by the neural network regression model, based on the unique binary vector representing the category;
   identifying one or more potential buyers based on searches and past purchases;
   determining tendencies and preferences of the one or more potential buyers by analyzing the past purchases;
   generating one or more listings for the FSO, wherein the one or more listings have varying titles, descriptions, pictures and offer prices; and
   customizing one or more of the generated one or more listings based on the determined tendencies and preferences of the one or more potential buyers.

2. The method of claim 1, wherein the information includes pictures of the FSO, and wherein the determining the category comprises:
   analyzing the pictures to determine the category of the FSO.

3. The method of claim 1, wherein specifications include an election of a charity option, and wherein the generating the optimal offer price comprises:
   passing the specifications to the neural network regression model to generate the optimal offer price;
   lowering value of a hidden layer node of the neural network regression model based on the election of the charity option; and
   generating a lower optimal offer price when the charity option is elected.

4. The method of claim 1, further comprising:
   receiving an indication of a charity to whom to distribute proceeds of a sale;
   determining a sell-by date based on the charity indication; and
   adjusting the optimal offer price based on the charity indication.

5. The method of claim 1, further comprising:
   generating a seller flexibility curve for a seller selling the FSO, the seller flexibility curve indicating a flexibility in lowering the optimal offer price;
   displaying the seller flexibility curve; and
   receiving an adjustment to the seller flexibility curve.

6. The method of claim 5, wherein the seller flexibility curve is generated based on past price reductions of one or more products listed for sale by the seller.

7. The method of claim 1, further comprising:
   identifying a plurality of potential buyers based on searches and past purchases;
   customizing a listing based one or more potential buyers of the plurality of potential buyers; and
   forwarding the customized listing to the respective one or more potential buyers.

8. A system comprising at least one processor configured to perform operations comprising:
   determining a numerical identifier corresponding to a category of a for sale object (FSO);
   performing a binarization of the numerical identifier using hot encoding, wherein the binarization of the numerical identifier generates a unique binary vector representing the category;
   using a neural network regression model, operating across one or more computing devices, to generate an optimal offer price based on at least the category of the FSO;
   providing information including textual input about the FSO to the neural network regression model, wherein the neural network regression model is configured to tokenize the textual input;
   providing the unique binary vector representing the category instead of the numerical identifier to the neural network regression model;
   outputting the optimal offer price, generated by the neural network regression model, based on the unique binary vector representing the category;
   identifying one or more potential buyers based on searches and past purchases;
   determining tendencies and preferences of the one or more potential buyers by analyzing the past purchases;
   generating one or more listings for the FSO, wherein the one or more listings have varying titles, descriptions, pictures and offer prices; and
   customizing one or more of the generated one or more listings based on the determined tendencies and preferences of the one or more potential buyers.

9. The system of claim 8, wherein the information includes pictures of the FSO, and wherein the determining the category comprises:
   analyzing the pictures to determine the category of the FSO.

10. The system of claim 8, wherein specifications include an election of a charity option, and wherein the generating the optimal offer price comprises:
    passing the specifications to the neural network regression model to generate the optimal offer price;

lowering value of a hidden layer node of the neural network regression model based on the election of the charity option; and generating a lower optimal offer price when the charity option is elected.

11. The system of claim 8, the operations further comprising:

receiving an indication of a charity to whom to distribute proceeds of a sale;

determining a sell-by date based on the charity indication; and adjusting the optimal offer price based on the charity indication.

12. The system of claim 8, the operations further comprising:

generating a seller flexibility curve for a seller selling the FSO, the seller flexibility curve indicating a flexibility in lowering the optimal offer price;

displaying the seller flexibility curve; and receiving an adjustment to the seller flexibility curve.

13. The system of claim 12, wherein the seller flexibility curve is generated based on past price reductions of one or more products listed for sale by the seller.

14. The system of claim 8, the operations further comprising:

identifying a plurality of potential buyers based on searches and past purchases;

customizing a listing based one or more potential buyers of the plurality of potential buyers; and forwarding the customized listing to the respective one or more potential buyers.

15. A non-transitory processor-readable medium having one or more instructions operational on a computing device which, when executed by a processor, cause the processor to perform operations comprising:

determining a numerical identifier corresponding to a category of a for sale object (FSO);

performing a binarization of the numerical identifier using hot encoding, wherein the binarization of the numerical identifier generates a unique binary vector representing the category;

using a neural network regression model, operating across one or more computing devices, to generate an optimal offer price based on at least the category of the FSO;

providing information including textual input about the FSO to the neural network regression model, wherein the neural network regression model is configured to tokenize the textual input;

providing the unique binary vector representing the category instead of the numerical identifier to the neural network regression model;

outputting the optimal offer price, generated by the neural network regression model, based on the unique binary vector representing the category;

identifying one or more potential buyers based on searches and past purchases;

determining tendencies and preferences of the one or more potential buyers by analyzing the past purchases;

generating one or more listings for the FSO, wherein the one or more listings have varying titles, descriptions, pictures and offer prices; and customizing one or more of the generated one or more listings based on the determined tendencies and preferences of the one or more potential buyers.

16. The non-transitory processor-readable medium of claim 15, wherein the information includes pictures of the FSO, and wherein the determining the category comprises:

analyzing the pictures to determine the category of the FSO.

17. The non-transitory processor-readable medium of claim 15, wherein specifications include an election of a charity option, and wherein the generating the optimal offer price comprises:

passing the specifications to the neural network regression model to generate the optimal offer price;

lowering value of a hidden layer node of the neural network regression model based on the election of the charity option; and generating a lower optimal offer price when the charity option is elected.

18. The non-transitory processor-readable medium of claim 15, the operations further comprising:

receiving an indication of a charity to whom to distribute proceeds of a sale;

determining a sell-by date based on the charity indication; and adjusting the optimal offer price based on the charity indication.

19. The non-transitory processor-readable medium of claim 15, the operations further comprising:

generating a seller flexibility curve for a seller selling the FSO, the seller flexibility curve indicating a flexibility in lowering the optimal offer price;

displaying the seller flexibility curve; and receiving an adjustment to the seller flexibility curve.

20. The non-transitory processor-readable medium of claim 19, wherein the seller flexibility curve is generated based on past price reductions of one or more products listed for sale by the seller.

* * * * *